(12) United States Patent
Arai et al.

(10) Patent No.: US 8,832,025 B2
(45) Date of Patent: Sep. 9, 2014

(54) LOCAL FILE SERVER TRANSFERRING FILE TO REMOTE FILE SERVER VIA COMMUNICATION NETWORK AND STORAGE SYSTEM COMPRISING THOSE FILE SERVERS

(75) Inventors: Hitoshi Arai, Chigasaki (JP); Homare Kanie, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 945 days.

(21) Appl. No.: 12/989,940

(22) PCT Filed: May 27, 2010

(86) PCT No.: PCT/JP2010/059045
§ 371 (c)(1),
(2), (4) Date: Oct. 27, 2010

(87) PCT Pub. No.: WO2011/148496
PCT Pub. Date: Dec. 1, 2011

(65) Prior Publication Data
US 2012/0016838 A1    Jan. 19, 2012

(51) Int. Cl.
*G06F 17/00* (2006.01)
(52) U.S. Cl.
USPC ........... 707/634; 707/610; 707/661; 707/758; 707/821; 709/208; 709/217
(58) Field of Classification Search
None
See application file for complete search history.

(56) References Cited

U.S. PATENT DOCUMENTS

| 5,313,631 | A | 5/1994 | Kao | |
|---|---|---|---|---|
| 6,269,382 | B1 | 7/2001 | Cabrera et al. | |
| 7,802,310 | B2 * | 9/2010 | Farber et al. | 726/28 |
| 7,945,539 | B2 * | 5/2011 | Farber et al. | 707/689 |
| 7,945,544 | B2 * | 5/2011 | Farber et al. | 707/698 |
| 7,949,662 | B2 * | 5/2011 | Farber et al. | 707/747 |
| 8,001,096 | B2 * | 8/2011 | Farber et al. | 707/698 |
| 8,082,262 | B2 * | 12/2011 | Farber et al. | 707/758 |
| 8,099,420 | B2 * | 1/2012 | Farber et al. | 707/758 |
| 8,117,274 | B2 * | 2/2012 | Schilders | 709/213 |

(Continued)

FOREIGN PATENT DOCUMENTS

| EP | 0 515 073 B1 | 3/1998 |
|---|---|---|
| JP | H05-158770 | 6/1993 |

(Continued)

OTHER PUBLICATIONS

PCT International Search Report and Written Opinion on Application No. PCT/JP2010/059045 dated Jun. 22, 2010; 7 pages.

(Continued)

*Primary Examiner* — Hung Le
(74) *Attorney, Agent, or Firm* — Foley & Lardner LLP

(57) ABSTRACT

A remote file server managing a remote storage device and a local file server managing a local storage device are coupled to a communication network (e.g. the Internet). The local file server (A) replicates a file in the local storage device to the remote file server and, (B) if a first condition is satisfied, manages the replicated file which is the file from which the data is replicated as a migration target file. The local file server, even if the (B) is completed, does not delete the migration target file from the local storage device and, if the second condition is satisfied, deletes the migration target file from the local storage device.

11 Claims, 22 Drawing Sheets

(56) References Cited

U.S. PATENT DOCUMENTS

| | | | |
|---|---|---|---|
| 8,170,990 B2* | 5/2012 | Shitomi | 707/640 |
| 2004/0243686 A1* | 12/2004 | Schilders | 709/213 |
| 2005/0273486 A1* | 12/2005 | Keith, Jr. | 709/200 |
| 2006/0129537 A1 | 6/2006 | Torii et al. | |
| 2007/0088702 A1* | 4/2007 | Fridella et al. | 707/10 |
| 2007/0185848 A1* | 8/2007 | Farber et al. | 707/3 |
| 2008/0065635 A1* | 3/2008 | Farber et al. | 707/6 |
| 2008/0066191 A1* | 3/2008 | Farber et al. | 726/28 |
| 2008/0071855 A1* | 3/2008 | Farber et al. | 709/201 |
| 2008/0082551 A1* | 4/2008 | Farber et al. | 707/10 |
| 2009/0125522 A1 | 5/2009 | Kodama et al. | |
| 2009/0300079 A1* | 12/2009 | Shitomi | 707/204 |
| 2011/0196894 A1* | 8/2011 | Farber et al. | 707/770 |
| 2011/0231647 A1* | 9/2011 | Farber et al. | 713/150 |
| 2012/0117111 A1* | 5/2012 | Farber et al. | 707/770 |

FOREIGN PATENT DOCUMENTS

| | | |
|---|---|---|
| JP | 2006-039942 | 2/2006 |
| JP | 2006-164211 | 6/2006 |
| JP | 2009-110401 | 5/2009 |
| JP | 2009-289252 | 12/2009 |

OTHER PUBLICATIONS

European Patent Office extended search report on application 10852166.7 mailed Jan. 28, 2014; 9 pages.

* cited by examiner

| inode number | Owner | Access right | Size | Data block address 1 | Data block address 2 | Data block address 3 |
|---|---|---|---|---|---|---|
| ... | ... | ... | ... | ... | ... | ... |
| 100 | user001 | u:g:o rxw rxw rxw | 100KB | 100-3 | 200-2 | 250-5 |
| ... | ... | ... | ... | ... | ... | ... |

| inode number | Owner | Stubbing flag | Data synchronization necessity flag | Metadata synchronization necessity flag | Replication flag | Link destination | |
|---|---|---|---|---|---|---|---|
| ... | ... | ... | ... | ... | ... | ... | ... ← 400 |
| 100 | user001 | ON or OFF | ON or OFF | ON or OFF | ON or OFF | http://www.xxx.co.jp/yyy.doc | ... |
| ... | ... | ... | ... | ... | ... | ... | ... |

3100 / 3101 / 3102 / 3103 / 3104

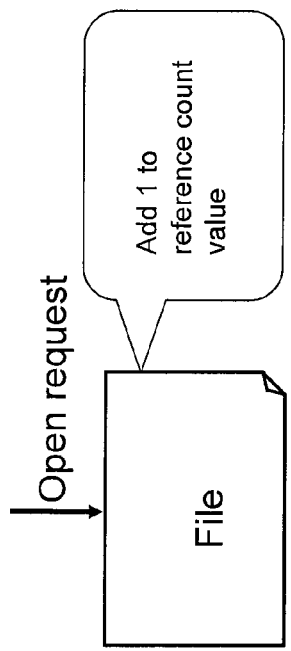
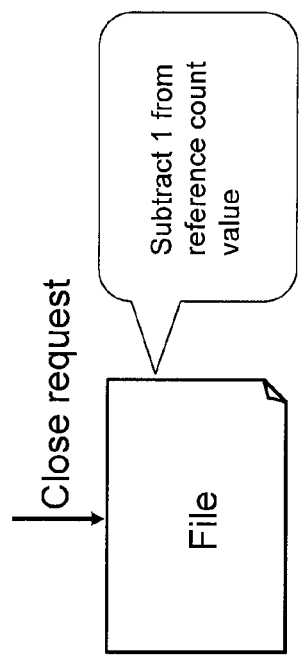
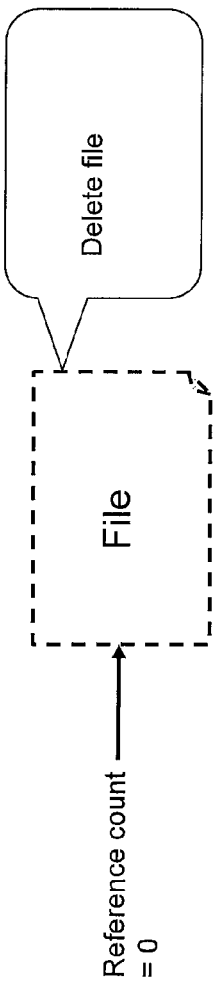

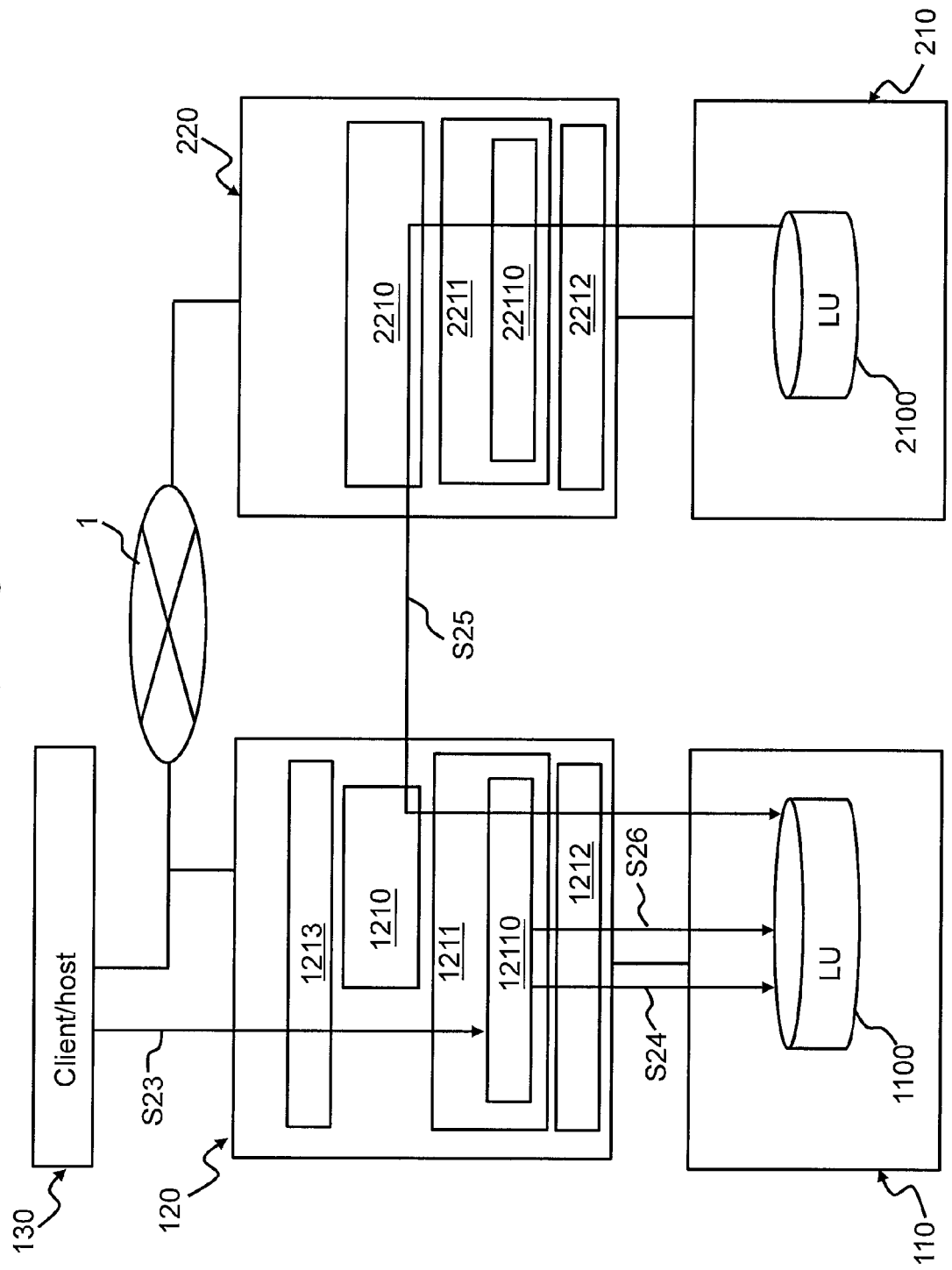

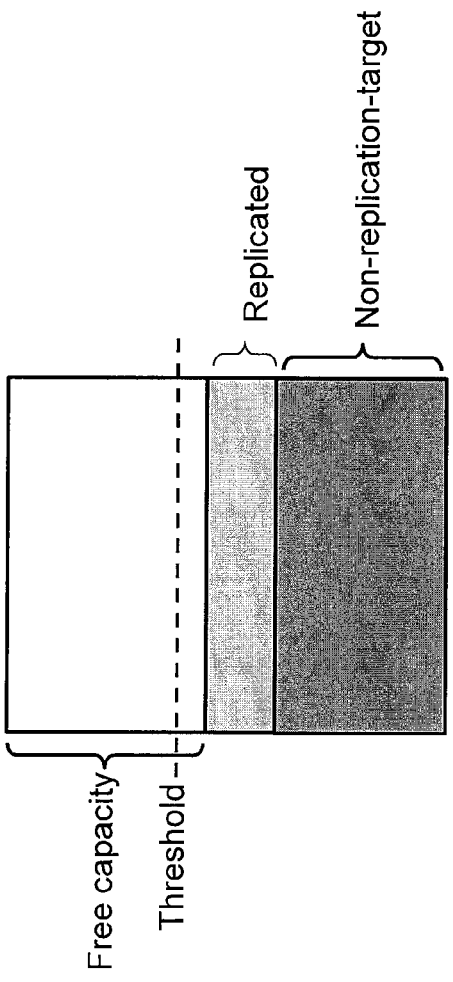
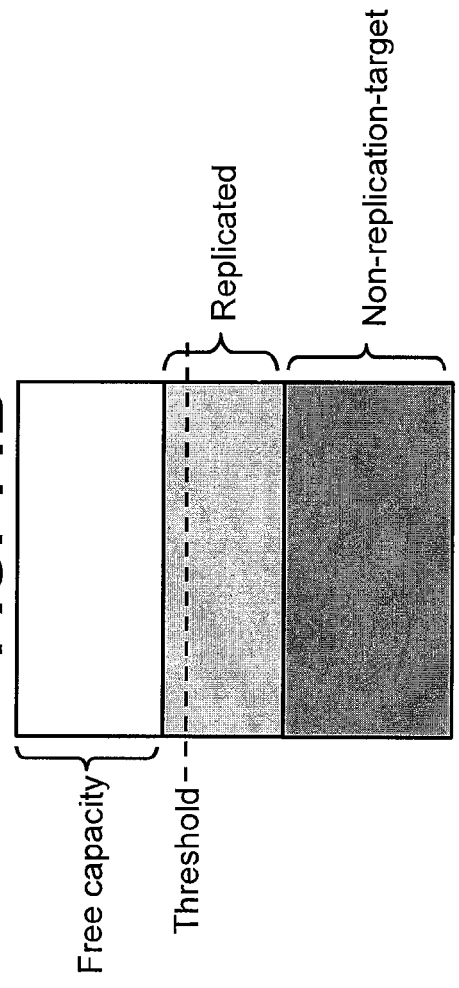

LOCAL FILE SERVER TRANSFERRING FILE TO REMOTE FILE SERVER VIA COMMUNICATION NETWORK AND STORAGE SYSTEM COMPRISING THOSE FILE SERVERS

TECHNICAL FIELD

This invention relates to a storage control of transferring and storing files via a communication network.

BACKGROUND ART

Conventionally, a form that companies or individuals purchase servers and software at their own expense and utilize the same was mainstream, but cloud computing of utilizing servers and software via the Internet for reducing a TCO (Total Cost of Ownership) tends to spread.

As an example of cloud computing, in the Patent Literature 1, an invention of making a storage apparatus available via the Internet (hereinafter referred to as a cloud storage apparatus) is described.

Furthermore, in the Patent Literature 2, an invention related to a hierarchy storage system in which multiple storage apparatuses are combined is described.

CITATION LIST

Patent Literature

PTL 1: Japanese Unexamined Patent Application Publication No. 2009-110401
PTL 2: Japanese Unexamined Patent Application Publication No. 2009-289252

SUMMARY OF INVENTION

Technical Problem

In the above-mentioned conventional technologies, a file in the cloud storage apparatus must be accessed via the Internet. Therefore, this causes a delay in data transfer, and slows down the access speed.

Furthermore, the determination whether to store the file in the cloud storage apparatus or in the local storage apparatus is left to the user. The access speed for the file stored in the cloud storage apparatus is slow as described above.

Therefore, the user tends to store the data in the local storage apparatus instead of the cloud storage apparatus by extending the local storage apparatus. As a result, there is a problem that the chance of utilizing the cloud storage apparatus decreases and that the TCO cannot be reduced eventually.

Therefore, it is preferable to appropriately determine whether to store the file in the local storage apparatus or in the cloud storage apparatus, without leaving the determination to the user. However, by that method, depending on the type of the file the user utilizes, it is possible that the access via the Internet occurs frequently and that, coupled with the above-mentioned transfer delay, an access performance for the file (especially the read performance) might be deteriorated.

The above-mentioned problems might occur in other types of communication network than the Internet.

Therefore, the purpose of this invention is to increase the chance of utilizing the remote storage apparatus while avoiding deteriorating the access performance for the file as much as possible.

Solution to Problem

A remote file server managing a remote storage device and a local file server managing a local storage device are coupled to a communication network (e.g. the Internet). The local file server (A) replicates a file in the local storage device to the remote file server and, (B) if a first condition is satisfied, manages the replicated file which is the file from which the data is replicated as a migration target file. The local file server, even if the (B) is completed, does not delete the migration target file from the local storage device and, if the second condition is satisfied, deletes the migration target file from the local storage device. The second condition is, for example, that the migration target file is referred to, and then not referred to by any user terminals.

BRIEF DESCRIPTION OF DRAWINGS

FIG. 6 shows new types of metadata added to the inode management table 400.
FIG. 12A shows a processing performed in response to an open request.
FIG. 12B shows a processing performed in response to a close request.
FIG. 12C shows a file deletion.
FIG. 13 shows the flow of a write processing for the migrated file.
FIG. 14A shows an example of a free capacity in an LU.
FIG. 14B shows an example where the free capacity of the LU decreases to under a threshold because a recalled file is written to the LU.

DESCRIPTION OF EMBODIMENTS

One embodiment of this invention is described below.
Note that, though the description below might describe various types of information using the term of "an xxx table,"

the various types of information may also be expressed by other data structures than tables. For showing the independence of the data structure, "an xxx table" can be referred to as "xxx information."

Furthermore, in the description below, though the processing might be described with a "program" as a subject, since the program performs the specified processing by being executed by a processor (e.g. a CPU (Central Processing Unit)), using a storage resource (e.g. a memory) and/or a communication interface device (e.g. a communication port) appropriately, the subject of the processing may also be a processor. The processing described with the program as a subject may also be supposed to be the processing performed by a file server (e.g. a file storage apparatus or an archive apparatus described later). Furthermore, the processor may also include a hardware circuit which performs a part of or the entire processing which the processor performs. The computer program may also be installed from a program source to each computer. The program source, for example, may also be a program distribution server or a storage media.

Figure 1:
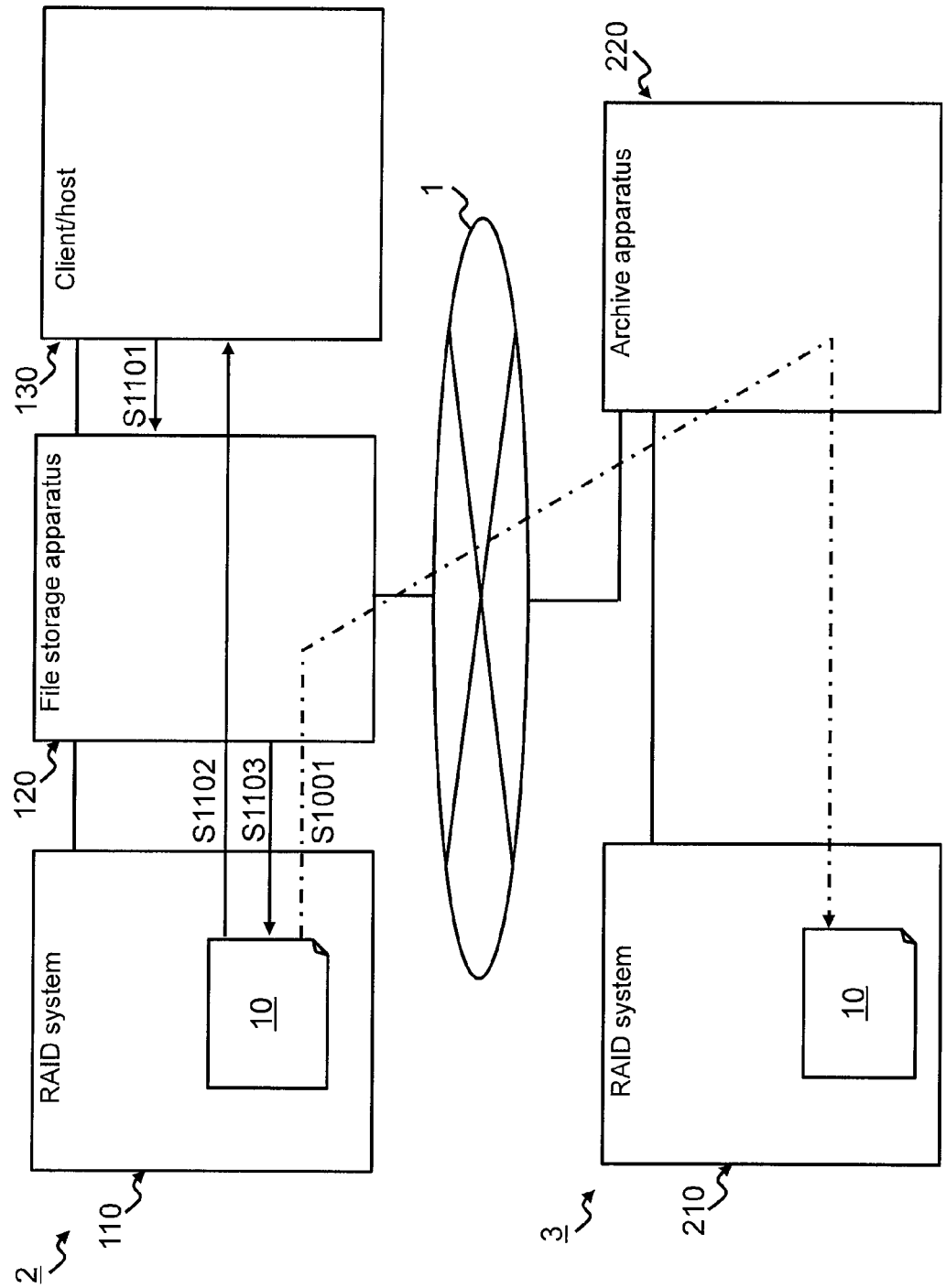
FIG. 1 shows an overview of one embodiment of this invention.

FIG. 1 shows the overview of an embodiment of this invention.

A local computer system 2 and a remote computer system 3 exist.

The local computer system 2 comprises a client (e.g. a personal computer)/host (e.g. server) 130, a file storage apparatus 120 and a RAID (Redundant Array of Independent (or Inexpensive) Disks) system 110. To the file storage apparatus 120, the client/host 130 and the RAID system 110 are connected. The file storage apparatus 120 is an example of an local file server.

The remote computer system 3 comprises an archive apparatus 220 and a RAID system 210. The archive apparatus 220 is an example of a remote file server.

The file storage apparatus 120 and the archive apparatus 220 are connected via a communication network 1. The communication network 1 is the Internet typically, but may also be other types of communication network (e.g. LAN (Local Area Network))

In this embodiment, for example, the processing described below is performed.

That is, the file storage apparatus 120 receives a file write request from the client/host 130 and, in accordance with the write request, writes a file 10 to the RAID system 110.

After that, the file storage apparatus 120 replicates the file 10 (S1001). As more specifically described, the file storage apparatus 120 reads the file 10 from the RAID system 110, and transfers the read file 10 to the archive apparatus 220 via the communication network 1. The archive apparatus 220 writes the file from the file storage apparatus 120 to the RAID system 210. This method creates the status where the file 10 exists both in the RAID system 110 and in the RAID system 210.

The file storage apparatus 120 does not delete the file 10 from the RAID system 110 immediately after the replication of the file 10 is completed. This is because doing that is equivalent to migrating the file 10. For providing the file 10 to the client/host 130 after the file 10 is migrated to the remote computer system 3, the file storage apparatus 120 must require the file 10 of the archive apparatus 220 via the communication network 1.

Therefore, in this embodiment, the file storage apparatus 120, even if the replication of the file 10 is completed, saves the file 10 without deleting the same from the RAID system 110.

Therefore, the file storage apparatus 120, if receiving a read request for the file 10 from the client/host 130 (S1101), can read the file 10 from the RAID system 110 and provide the same to the client/host 130 (S1102). That is, the file storage apparatus 120 does not have to acquire the file 10 from the archive apparatus 220 via the communication network 1.

The file storage apparatus 120, if the file 10 is not read (referred to) by any of the clients/hosts 130 any more, deletes the file 10 (to be more scrict, the entity of the same) (S1103). As a result of this, the file 10 is practically supposed to be stored only in the archive storage apparatus 220. Note that, as the timing for deleting the file 10, instead of or in addition to that the file 10 is not read by any of the clients/hosts 130 any more, that another condition (for example, that a certain length of time passed after the point of time of the last access (read) for the file 10) is satisfied may also be adopted.

Hereinafter, the details of this embodiment are described.

Figure 2:
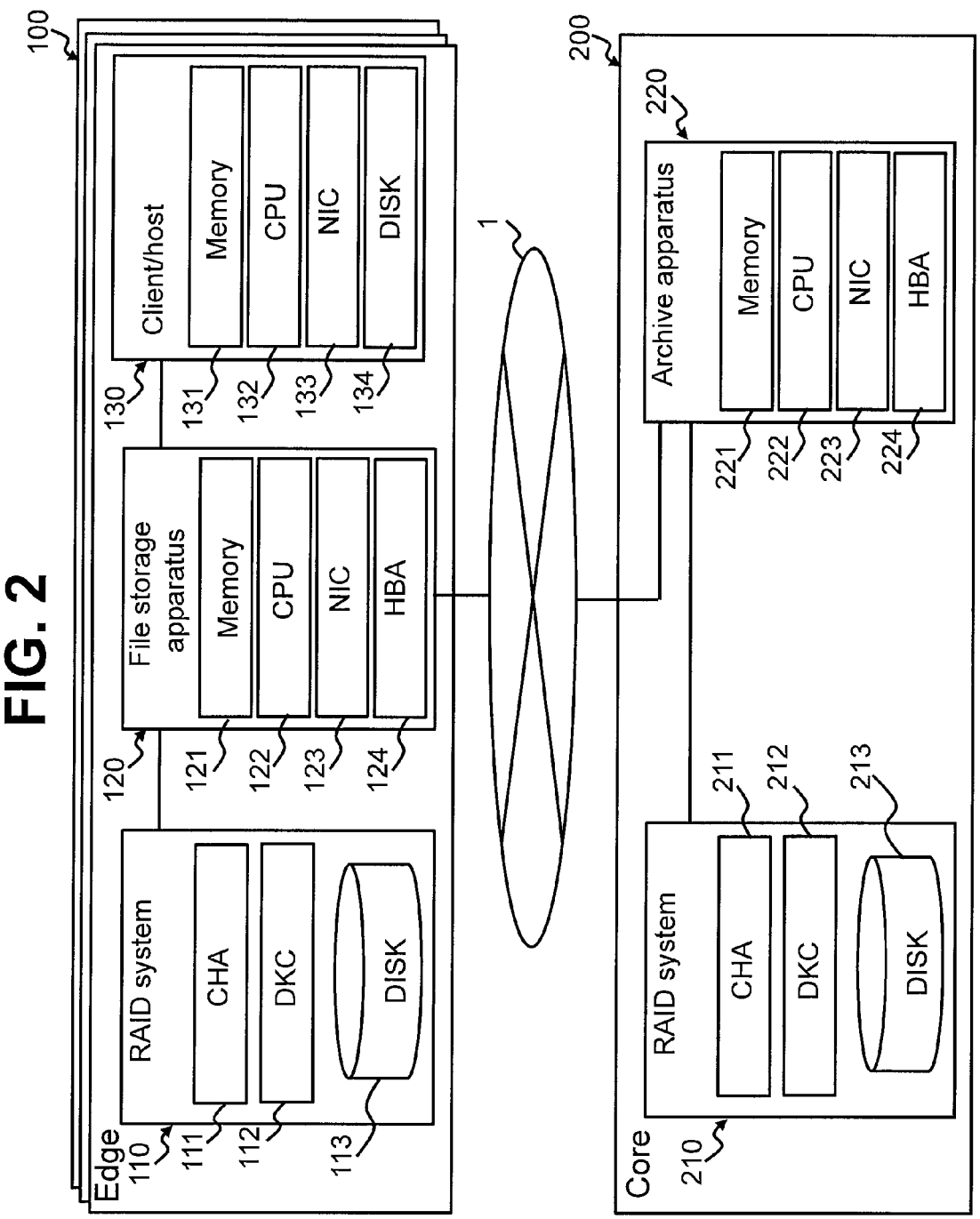
FIG. 2 shows a hardware configuration of an entire system related to the one embodiment of this invention.

FIG. 2 shows a hardware configuration of the entire system related to the one embodiment of this invention.

An Edge 100 and a Core 200 exist. The Edge 100 is a base including a local computer system, for example, a branch or an office which is the base where the user actually operates the business. Furthermore, the Core 200 is a base including a remote computer system, for example, a base where the integrated management of servers and storage apparatuses is performed or a base where the cloud service is provided.

Note that, though multiple Edges 100 and a single Core 200 exist in the example shown in FIG. 1, it may also be permitted that a single Edge 100 and/or multiple Cores 200 exist. Furthermore, though one client/host 130 coupled to the file storage apparatus 120 is shown in FIG. 1, actually, multiple clients/hosts 130 are coupled to the file storage apparatus 120 (as shown in the figure, one client/host 130 may also be permitted).

The Edge 100 comprises a RAID system 110, a file storage apparatus 120, and a client/host 130. The file storage apparatus 120 is coupled to the client/host 130, for example, via the communication network (e.g. LAN). Furthermore, the file storage apparatus 120 is coupled to the RAID system 110, for example, via the communication network (e.g. SAN (Storage Area Network)).

The RAID system 110 can be broadly divided into a controller unit and a storage unit. The controller unit comprises a CHA (Channel Adaptor) 111 and a DKC (DisK Controller) 112. The storage unit comprises a DISK 113. To the DKC 112, the CHA 111 and the DISK 113 are connected. The CHA 111 is a communication interface device coupled to the file storage apparatus 120. The DKC 112 is a controller. The DISK 113 is a disk-type physical storage device (e.g. an HDD (Hard Disk Drive)). As a physical storage device, other types of physical storage devices (e.g. a flash memory device) may also be adopted. Furthermore, though a single DISK 113 exists in FIG. 1, actually, multiple DISKs 113 exist (a single DISK 113 as shown in the figure may also be permitted). Multiple DISK 113s may configure one or more RAID groups.

The RAID system 110 receives a block-level I/O request transmitted from the file storage apparatus 120 at the CHA 111 and, in accordance with the control by the DKC 112, performs the I/O for the appropriate DISK 113.

The file storage apparatus 120 comprises a memory 121, a CPU (Central Processing Unit) 122, an NIC (Network Interface Card) 123, and an HBA (Host Bus Adaptor) 124. To the memory 121, the NIC 123, and the HBA 124, the CPU 122 is connected.

The NIC 123 is a communication interface device which communicates with the archive apparatus 220 and the client/host 130.

The HBA 124 is a communication interface device which communicates with the RAID system 110.

The memory 121 is a storage area where the CPU 122 can read and write directly (e.g. a RAM (Random Access Memory) or a ROM (Read Only Memory)). The file storage apparatus 120 reads a program controlling the file storage apparatus 120 (e.g. an OS (Operating System)) on the memory 121, and makes the CPU 122 perform the program. The file storage apparatus 120, instead of or in addition to the memory 121, may also comprise other types of storage resources.

The file storage apparatus 120 receives a file-level I/O request from the client/host 130 via the NIC 123. The file storage apparatus 120 creates an I/O request (a block-level I/O request) for the I/O of the data block configuring the file specified by the I/O request. The file storage apparatus 120 transmits the block-level I/O request to the RAID system 110 via the HBA 124.

The client/host 130 comprises a memory 131, a CPU 132, an NIC 133, and a DISK 134. The client/host 130, instead of or in addition to the memory 131 and/or the DISK 134, may also comprise other types of storage resources.

The client/host 130 reads a program stored in the DISK 134 (a program controlling the client/host 130 (e.g. an OS)) on the memory 131, and makes the CPU 132 perform the program. Furthermore, the client/host 130 transmits the file-level I/O request to the file storage apparatus 120 via the NIC 133.

The Core 200 comprises a RAID system 210 and an archive apparatus 220. To the archive apparatus 220, the RAID system 210 is connected.

The RAID system 210 comprises a CHA 211, a DKC 212, and a DISK 213. In FIG. 1, the configuration of the RAID system 210 and the configuration of the RAID system 110 are the same. Therefore, the RAID system 210 also receives a block-level I/O request transmitted from the archive apparatus 220 at the CHA 211 and, in accordance with the control by the DKC 212, performs the I/O for the appropriate DISK 213. Note that the configuration of the RAID system 210 and the configuration of the RAID system 110 may also be different.

The archive apparatus 220 comprises a memory 221, a CPU 222, an NIC 223, and an HBA 224. Instead of or in addition to the memory 221, other types of storage resources may also be comprised. The archive apparatus 220 reads a program controlling the archive apparatus 220 (e.g. an OS) on the memory 221, and makes the CPU 222 perform the program. Furthermore the archive apparatus 220 communicates with the file storage apparatus 120 via the NIC 223 and the communication network 1. The archive apparatus 220 is connected via the HBA 224, and performs access in units of blocks.

Figure 3:
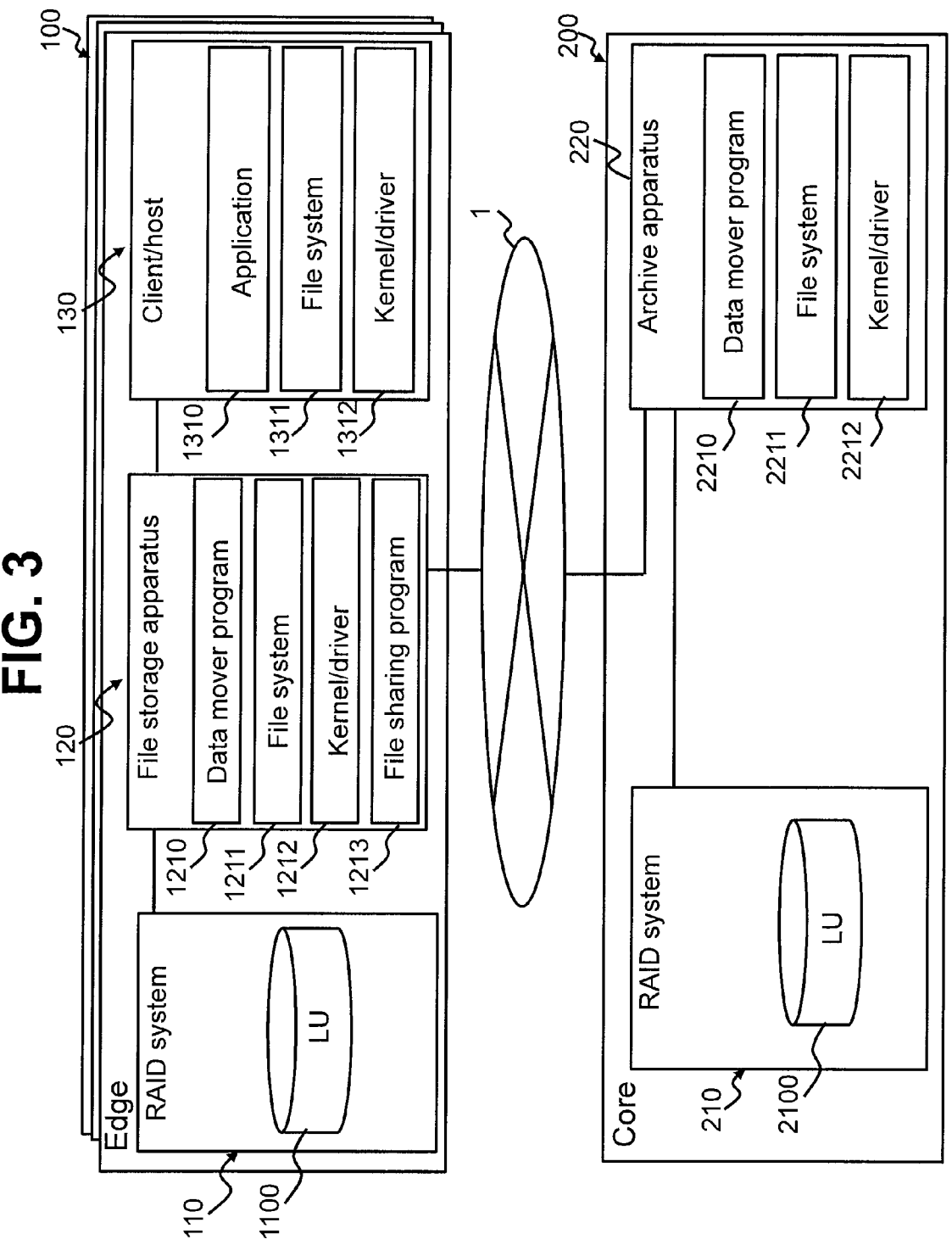
FIG. 3 shows a software configuration of the entire system related to the one embodiment of this invention.

FIG. 3 shows a software configuration of the entire system related to this embodiment The RAID system 110 (210) comprises multiple LUs (Logical Units) 1100 (2100). The LU 1100 (2100) is a logical storage device. The LU 1100 (2100) may be an actual LU based on one or more DISKs 113 (213), or may also be a virtual LU complying with Thin Provisioning. The LU 1100 (2100) is configured of multiple blocks (storage areas). In the LU 1100 (2100), files are stored. Furthermore, all or a part of the file system information which is described later may be stored in the LU 1100 (2100).

Figure 22:
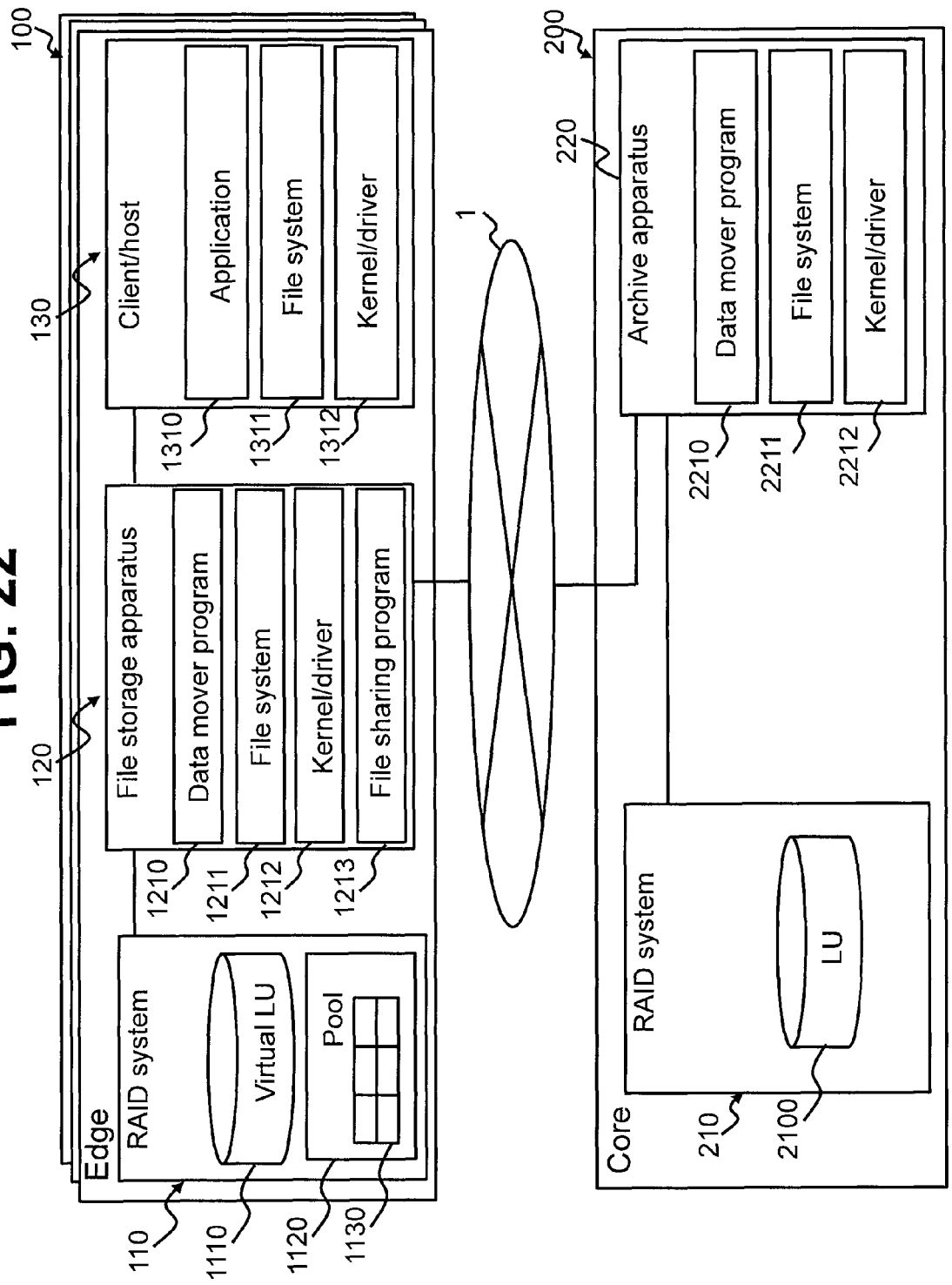
FIG. 22 shows a configuration where Thin Provisioning is applied to an LU on the Edge side in the software configuration of the entire system related to the one embodiment of this invention.

FIG. 22 is a figure showing the configuration where Thin Provisioning is applied to an LU on the Edge side in the software configuration of the entire system related to the one embodiment of this invention.

In the RAID system 110 to which Thin Provisioning is applied, one or multiple pools 1120 are prepared. The pool 1120 includes multiple pages 1130. The page 1130 is an individual storage area acquired by dividing the pool 1120 by a fixed length. A virtual LU (an LU to which Thin provisioning is applied) is configured of multiple virtual areas. Each time data is written to the virtual LU 1110, the page 1130 is assigned to the virtual area as the write destination of the virtual LU 1110. The capacity of the disk can be added in units of pools 1120. Multiple pages 1130 of different sizes may also be included in the pool 1120.

FIG. 3 is referred to again. In the memory 121 of the file storage apparatus 120 (the memory 221 of the archive apparatus 220), a data mover program 1210 (2210), a file system 1211 (2211), and a kernel/driver 1212 (2212) are stored. In the memory 121 of the file storage apparatus 120, furthermore, a file sharing program 1213 is stored. Hereinafter, a data mover program in the file storage apparatus 120 is referred to as a "local mover," a data mover program in the archive apparatus 220 is referred to as a "remote mover," and a program for which the distinction between those is not specifically made is referred to as a "data mover program." Between the file storage apparatus 120 and the archive apparatus 220, files are exchanged via the local mover 1210 and the remote mover 2210.

The local mover 1210 reads the replication target file from the LU 1100 of the RAID system 110, and transmits the file to the archive apparatus 220. The remote mover 2210 receives the replication target file from the file storage apparatus 120, and writes the file to the LU 2100 of the RAID system 210.

Furthermore, the local mover 1210 deletes the replicated file (to be more strict, the entity of the same) in the LU 1100 if a specified condition is satisfied and, by that method, realizes the practical migration of the replicated file. After that, the local mover 1210, if receiving a read request for the stub (metadata) of the deleted file from the client/host 130, acquires a file linked to the stub via the remote mover 2210, and transmits the acquired file to the client/host 130. Note that, in this embodiment, a "stub" indicates an object (metadata) associated with the information of the file storage destination (the information indicating the link destination). From the client/host 130, it cannot be ascertained whether the object is a file or a stub.

Figure 4:
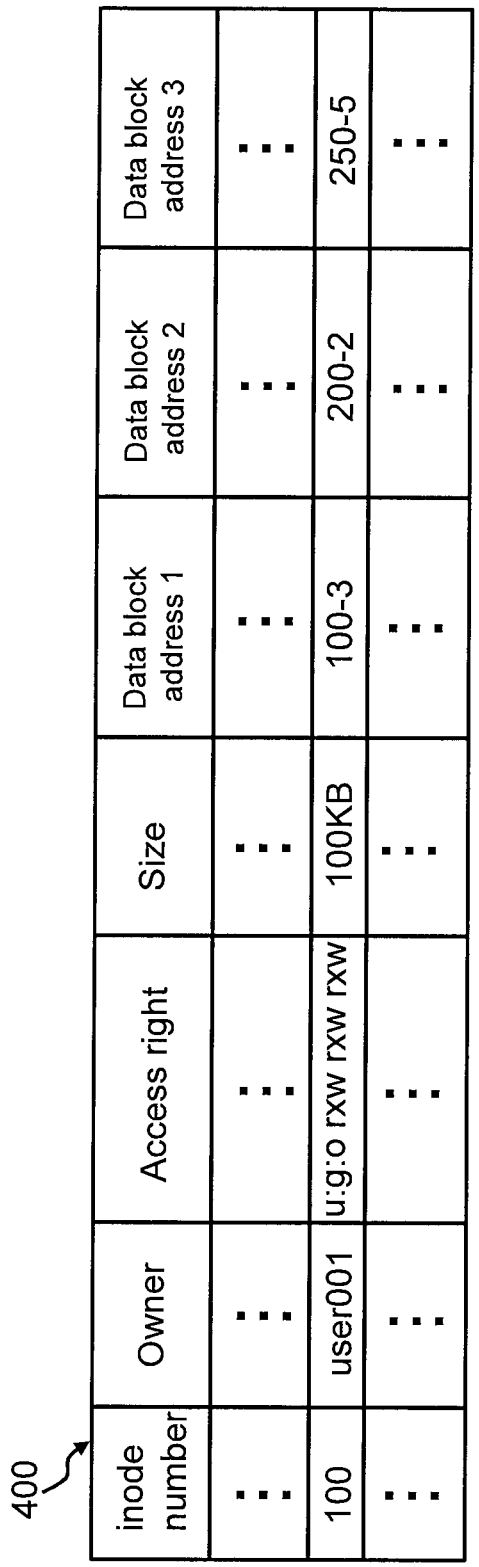
FIG. 4 shows an inode management table.
Figure 5:
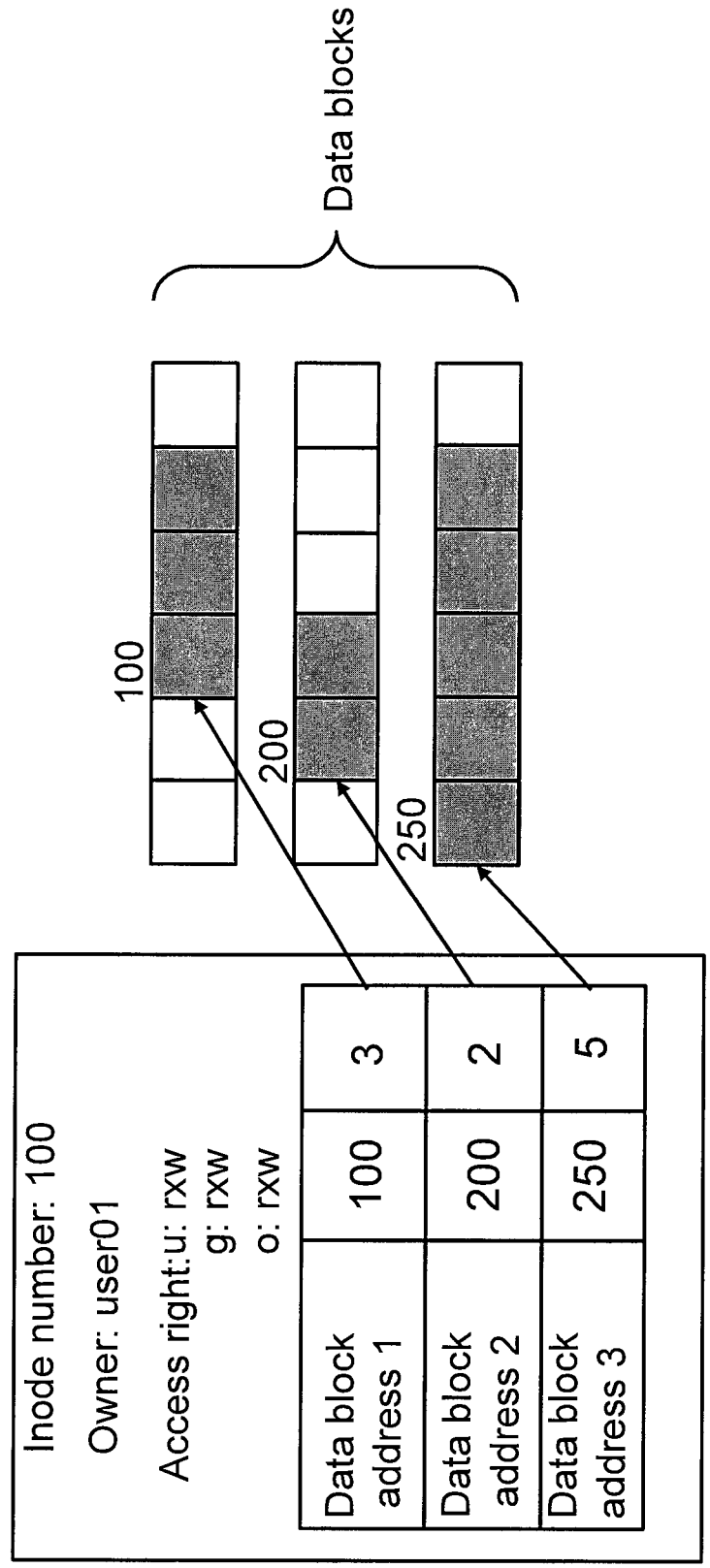
FIG. 5 shows the relationship between an inode whose inode number is "100" in the inode management table in FIG. 4 and the location of the file.

The file system 1211 (2211) is a file system program and manages file system information. The file system information includes the information related to each file (e.g. the information indicating the size and the location of the file). As more specifically described, for example, the file system information includes an inode management table 400 shown in FIG. 4. The inode management table 400 is configured of multiple inodes (one row corresponds to one inode). Each inode is configured of multiple metadata. The types of metadata are a file owner, a file access right, a file size, a file storage location (data block address 1, 2, 3, . . . ), and others. For example, a row including an inode number "100" indicates that the file is, as shown in FIG. 5, configured of the data stored by the blocks described below (blocks in the LU).

(*) The data in three consecutive blocks whose head is a block of address 100 (a group of blocks identified by a data block address "100-3").

(*) The data in two consecutive blocks whose head is a block of address 200 (a group of blocks identified by a data block address 2 "200-2").

(*) The data in five consecutive blocks whose head is a block of address 250 (a group of blocks identified by a data block address 3 "250-5").

FIG. 3 is referred to again. The kernel/driver 1212 (2212) performs the overall control and the hardware specific control, such as controlling the schedule of multiple programs (processes) running on the file storage apparatus 120 (the archive apparatus 220) and handling interrupt from the hardware.

The file sharing program 1213 is a program providing the file sharing service with the client/host 130 by using the communication protocols such as CIFS (Common Internet File System) and NFS (Network File System).

In the memory 131 of the client/host 130, an application 1310, a file system 1311, and a kernel/driver 1312 are stored.

The application 1310 is the software (application program) which the client/host 130 uses according to the purpose of the operation. The file system 1311 and the kernel/driver 1312 are nearly the same as the above-mentioned file system 1211 (2211) and kernel/driver 1212 (2212).

In this embodiment, new types of metadata are added to the inode management table 400.

FIG. 6 shows new types of metadata added to the inode management table 400.

Each file (each inode) comprises new types of metadata, which are a stubbing flag 3100, a data synchronization necessity flag 3101, a metadata synchronization necessity flag 3102, a replication flag 3103, and a link destination 3104. Hereinafter, these metadata are described with one file (referred to as a "target file" in the description of FIG. 6) as an example.

The stubbing flag 3100 indicates whether the target file is stubbed or not. As more specifically described, for example, the stubbing flag 3100 is set to "ON" if the target file is stubbed, and is set to "OFF" if the target file is not stubbed.

The data synchronization necessity flag 3101 (metadata synchronization necessity flag 3102) indicates whether the file (metadata) must be synchronized or not. The data synchronization necessity flag 3101 (metadata synchronization necessity flag 3102) is set to "OFF" if the target file (the metadata of the same) for which the replication is completed is consistent between the Edge 100 side and the Core 200 side. Meanwhile, the data synchronization necessity flag 3101 (metadata synchronization necessity flag 3102) is, if the target file (the metadata of the same) is updated on the Edge 100 side and is not consistent with the target file (the metadata of the same) on the Core 200 side any more (that is, if the files (metadata) are not synchronous any more), as both of the files (both of the metadata) must be consistent with each other, set to "ON."

The replication flag 3103 indicates whether the target file is the replication target or not. The replication flag 3103 is set to "ON" if the target file is replicated and, if the target file is not replicated, set to "OFF."

The link destination 3104 is the information indicating the storage destination of the target file (link destination) (e.g. an URL (Uniform Resource Locator)).

Next, the processing performed in this embodiment is described.

Figure 7:
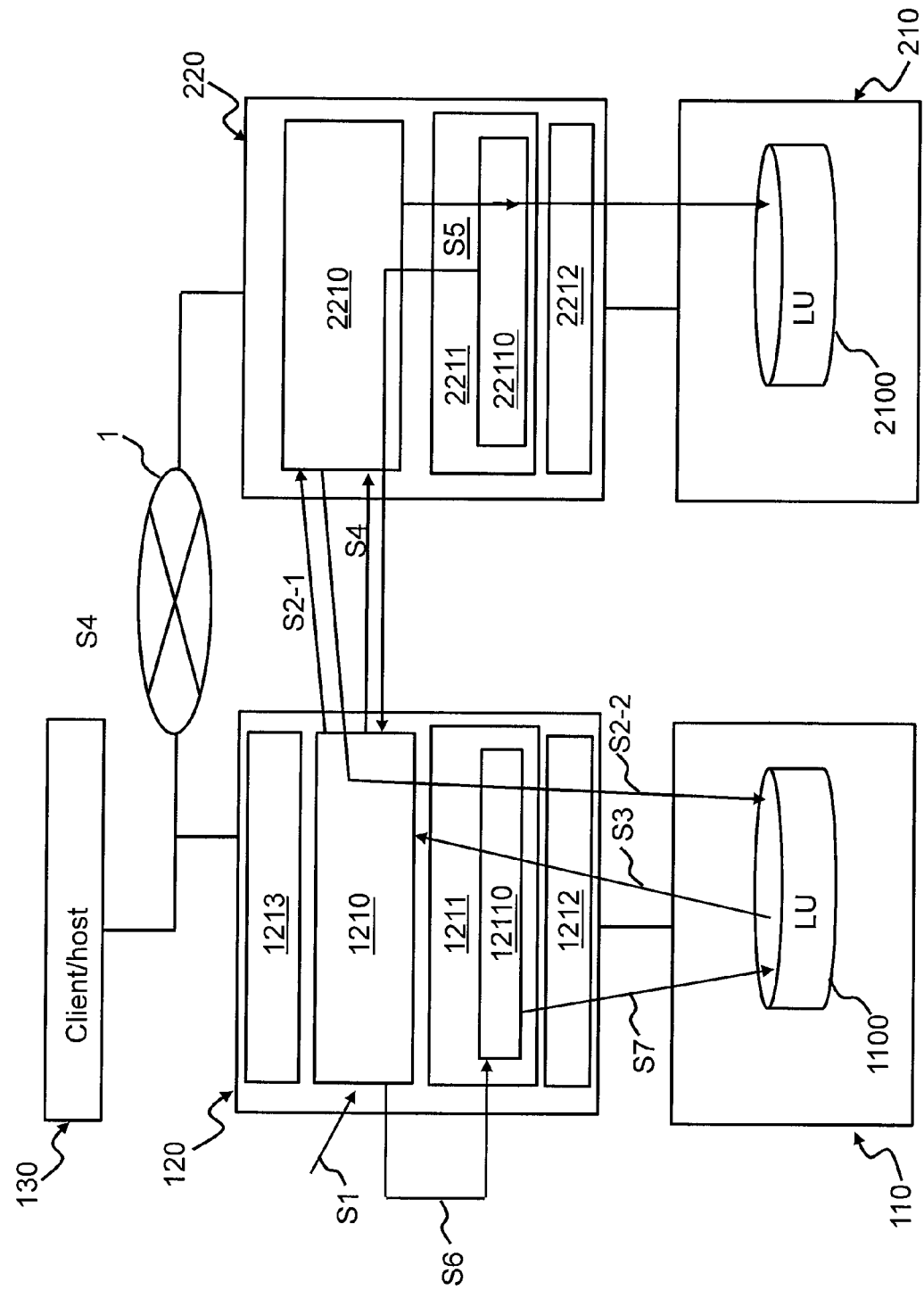
FIG. 7 shows the flow of a replication processing.

FIG. 7 shows the flow of a replication processing. Note that S * in the figure is an abbreviation of a STEP * (* is an integer which is 1 or larger).

By this processing, by the Edge 100 side and the Core 200 side, the replication target file is shared.

Firstly, at the STEP 1, the local mover 1210 receives a replication request. The issuing source of the replication request and the timing for issuing the replication request are not specifically limited. The replication request at least includes the identification information of the replication target file (e.g. the file name).

Next, at the STEP 2-1, the local mover 1210 instructs the archive apparatus 220 to secure the storage area of the replication target file. The instruction, for example, may also include the identification information and the size of the replication target file. The archive apparatus 220 (remote mover 2210), receiving the instruction, may secure the storage area as the storage destination of the replication target file. The archive apparatus 220 (remote mover 2210) can store the correspondence relationship between the identification information of the replication target file and the link destination information which is the information of the storage destination of the file (the information indicating the secured storage area) in the memory 221.

Next, at the STEP 2-2, the local mover 1210 receives the link destination information of the replication target file (e.g. an URL) from the archive apparatus 220 (remote mover 2210) and, as the link destination 3104 of the replication target file, adds the received link destination information to the inode management table 400.

Next, at the STEP 3, the file system 1211 reads the replication target file identified in accordance with the replication request from the LU 1100, and transfers the file to the local mover 1210.

Next, at the STEP 4, the local mover 1210 transfers the replication target file from the file system 1211 to the remote mover 2210. For example, the local mover 1210 may transmit the write request (file-level write request) of the replication target file which specifies the link destination information received at the STEP 2-2 to the remote mover 2210.

At the STEP 5, the remote mover 2210 receives the replication target file from the local mover 1210, and issues a storage request for the file to the file system 2211 (a reception program 22110 in the file system). The storage request may include the link destination information of the file. The file system 2211 writes the replication target file to the location based on the link destination information of the same (LU 2100). Then, it is notified from the file system 2211 to the remote mover 2210 that the write by the file system 2211 is completed. The remote mover 2210, if receiving the notification, transmits a replication completion notification to the local mover 1210.

At the STEP 6, the local mover 1210 receives the replication completion notification from the remote mover 2210, and notifies the replication completion to the reception program 12110 of the file system 1211.

Then, at the STEP 7, the file system 1211 (reception program 12110) sets the replication flag 3103 corresponding to the replication target file to "ON" (refer to FIG. 6). The file whose replication flag 3103 is "ON" is the replicated file.

Figure 8:
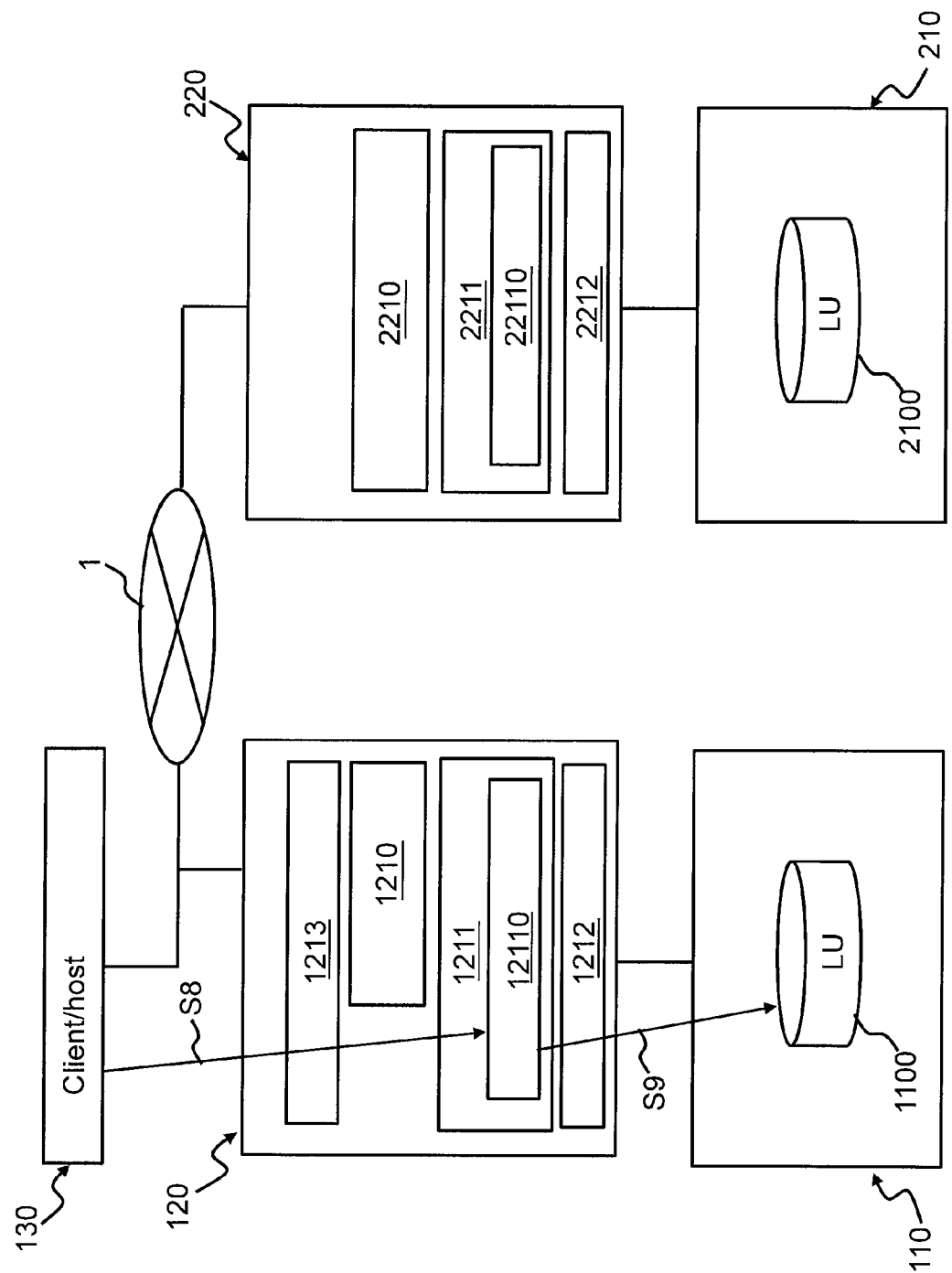
FIG. 8 shows the flow of a write processing for a replicated file or the metadata of the same.

FIG. 8 shows the flow of the write processing for the replicated file or the metadata of the same.

If the replicated file or the metadata of the same is updated, the replicated file of the file storage apparatus 120 or the metadata of the same and the replicated file of the archive apparatus 220 or the metadata of the same become different. Therefore, the synchronization processing for the replicated files or the metadata of the same (the processing for making the contents of the files (or the metadata of the same) consistent with each other between the file storage apparatus 120 and the archive apparatus 220) becomes necessary. In this write processing, the information indicating that the synchronization processing is necessary is set (the data/metadata synchronization necessity flags 3101/3102 corresponding to the replicated file are set to "ON").

Firstly, at the STEP 8, the file system 1211 (reception program 12110) receives a write request (update request) for the replicated file (or the metadata of the same).

Next, at the STEP 9, the file system 1211 (reception program 12110) updates the relevant file (or the metadata of the same). The file system 1211 (reception program 12110), if updating the replicated file, sets the data synchronization necessity flag 3101 corresponding to the file to "ON" and, if updating the metadata, sets the metadata synchronization necessity flag 3102 corresponding to the file for the metadata to "ON" (refer to FIG. 6). Note that whether the updated file or the metadata is a replicated file or the metadata of the same can be determined by whether the replication flag 3103 corresponding to the same is "ON" or not.

That the data/metadata synchronization necessity flag 3101/3102 is "ON" indicates that the synchronization processing for the file or the metadata of the same corresponding to the same is necessary. If the synchronization processing is performed, the data/metadata synchronization necessity flag 3101/3102 is set to "OFF."

Figure 9:
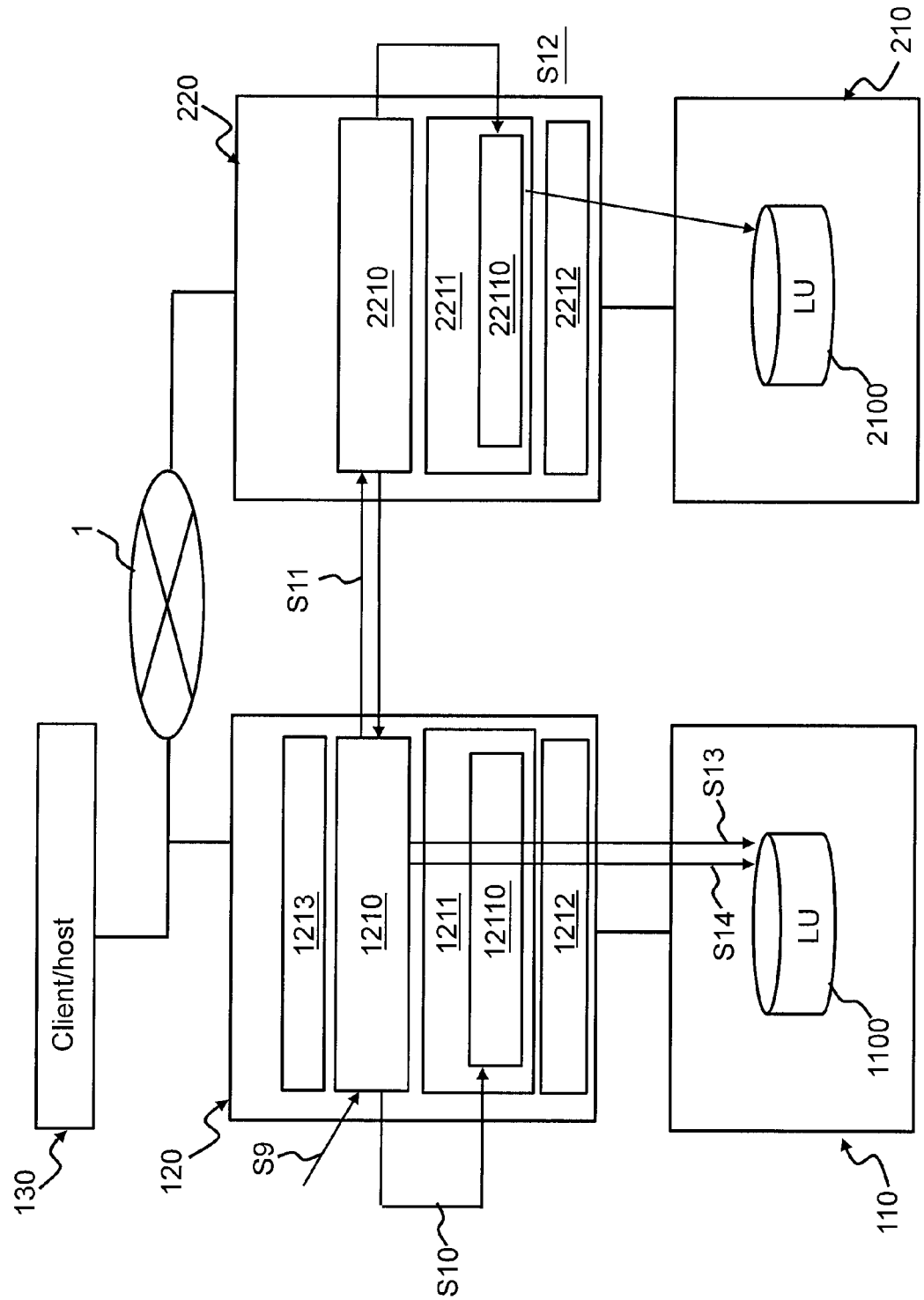
FIG. 9 shows the flow of a synchronization processing.

FIG. 9 shows the flow of the synchronization processing. For the file whose data synchronization necessity flag 3101 is "ON" or for the metadata for the file whose metadata synchronization necessity flag 3102 is "ON," the synchronization processing is performed.

Firstly, at the STEP 9, the local mover 1210 receives a synchronization processing request. The issuing source of the synchronization processing request and the timing for issuing the synchronization processing request are not specifically limited. The synchronization processing request may be issued, for example, regularly or irregularly (e.g. at the frequency of once a day).

At the STEP 10, the local mover 1210 issues a search request for the file and/or the metadata whose data/metadata synchronization necessity flag 3101/3102 is "ON" to the file system 1211 (reception program 12110), and acquires the file and/or the metadata from the file system 1211.

At the STEP 11, the local mover 1210 transfers the acquired file and/or metadata to the remote mover 2210.

At the STEP 12, the remote mover 2210 stores the file and/or the metadata from the local mover 1210 in the LU 2100 and/or the file system information. By this method, between local and remote, the files (and/or the metadata) become consistent with each other (that is, the synchronization is completed). The remote mover 2210, after storing the file and/or the metadata, notifies the storage completion to the local mover 1210.

After the file and/or the metadata is stored, at the STEP 13, the local mover 1210 changes the data/metadata synchronization necessity flag 3101/3102 corresponding to the file (and/or the metadata) for which the synchronization processing was performed to "OFF."

Note that, in this synchronization processing, after the synchronization of the files (and/or the metadata) is completed, the determination whether the replicated and synchronized file may be deleted from the LU 1100 or not (that is, whether the file may be switched from the replication target to the migration target or not) is performed.

As more specifically described, for example, the local mover 1210 checks the free capacity of the LU 1100. If the free capacity of the LU 1100 is below a specified threshold, for increasing the free capacity of the LU 1100, the deletion (migration) of the replicated and synchronized file is permitted. That is, at the STEP 14, the local mover 1210 sets the stubbing flag 3100 corresponding to the replicated and synchronized file (the file whose replication flag 3103 is "ON" and whose data/metadata synchronization necessity flag 3101/3102 is "OFF") to "ON," and sets the replication flag 3103 corresponding to the file to "OFF."

Note that, as the condition for the file deletion (migration) being permitted, instead of or in addition to the condition that the free capacity of the storage area (LU) where the file is stored is below the specified threshold, other conditions may be adopted. For example, the file whose deletion is permitted, for example, may be the file after the last access time for which a certain length of time passed.

In this embodiment, the deletion of the file whose deletion is permitted (migration target file) from the LU 1100 is not performed immediately after the replication of the relevant file is completed or immediately after the synchronization of the relevant file is completed. The migration target file remains in the local side until the specified condition for the file is satisfied. In this embodiment, the deletion of the migration target file from the LU 1100 is performed in the file read processing as described later.

Figure 10:
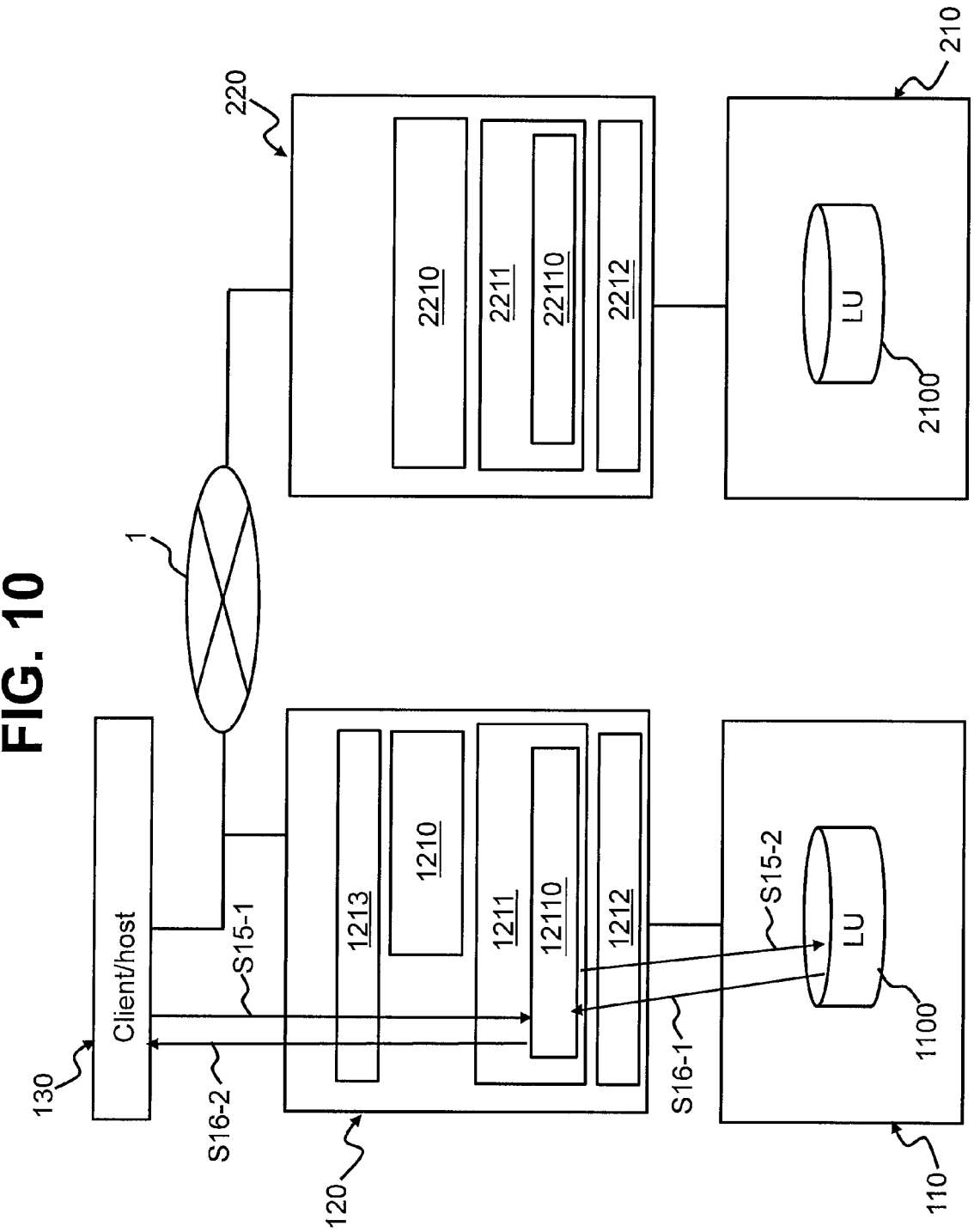
FIG. 10 shows the flow of a read processing of the metadata.

FIG. 10 shows the flow of the read processing of the metadata.

Firstly, at the STEP 15-1, the file system 1211 (reception program 12110) receives a metadata read request from the client/host 130 through the file sharing program 1213.

It is assumed that the read target metadata is the metadata of the file deleted from the LU 1100. Even if the file (to be more strict, the entity of the same) is deleted, the metadata for the file is also stored in the file storage apparatus 120.

Therefore, the file system 1211 does not acquire the metadata from the archive apparatus 220. As more specifically described, at the STEPs 15-2 and 16-1, the file system 1211 acquires the read target metadata from the file system information of the file storage apparatus 120 (the information stored in the LU 1100) and, at the STEP 16-2, transfers the metadata to the client/host 130 through the file sharing program 1213.

Figure 11:
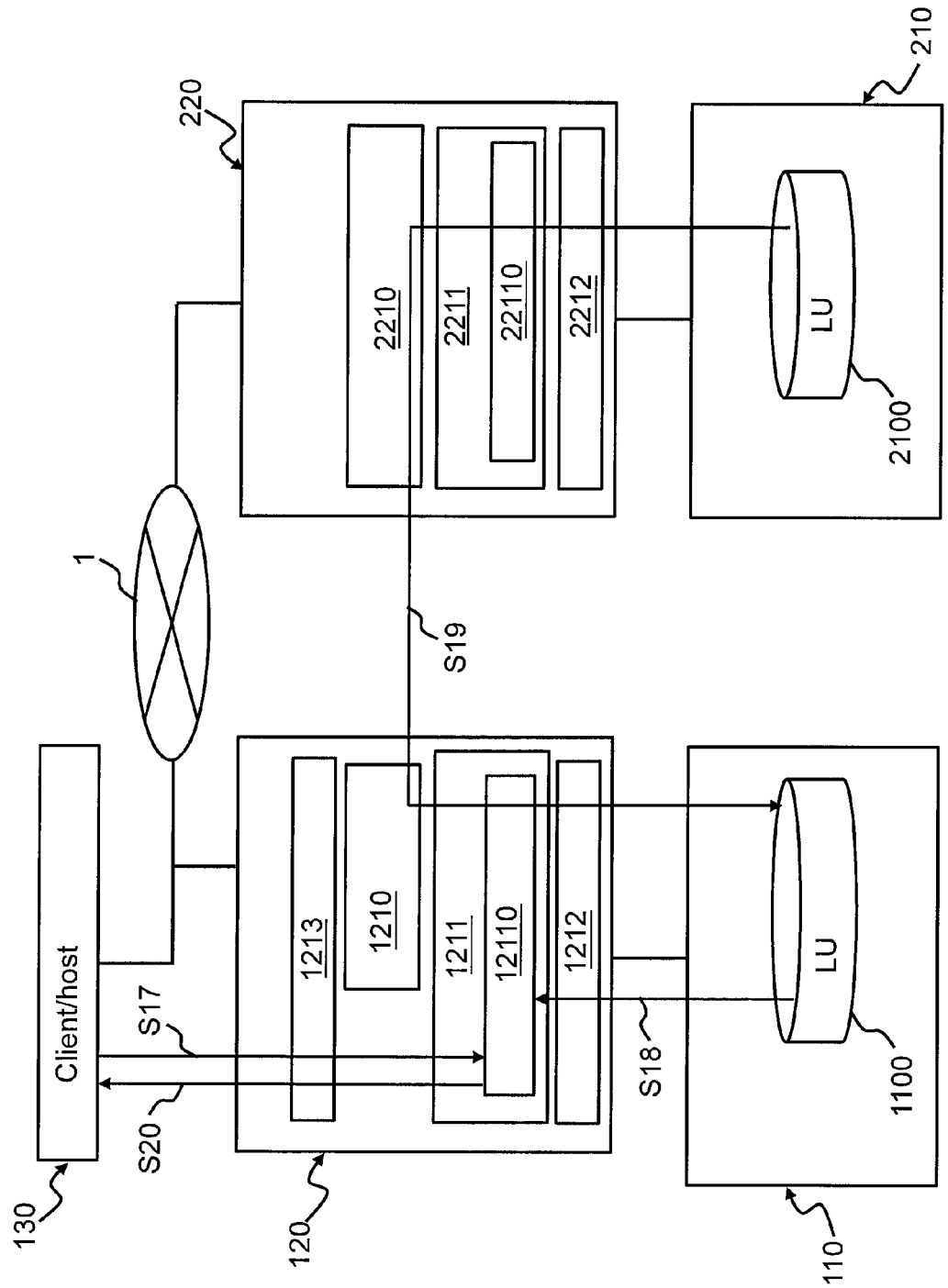
FIG. 11 shows the flow of a read processing of the file.

FIG. 11 shows the flow of the read processing of the file.

Firstly, at the STEP 17, the file system 1211 (reception program 12110) receives a file read request from the client/host 130 through the file sharing program 1213.

The file system 1211 (reception program 12110) determines whether the file is recalled or not. Whether the file is recalled or not can be determined, for example, by whether the value indicated by the data block address (refer to FIG. 4) for the file is 0 (zero) or not. That the value indicated by the address is 0 indicates that the file is not stored in the LU 1100.

If the file is recalled, at the STEP 18, the file system 1211 (reception program 12110) reads the read target file from the LU 1100 and, at the STEP 20, transmits the file to the client/host 130 through the file sharing program 1213.

Meanwhile, if the file is not recalled, the file system 1211 (reception program 12110), at the STEP 19, recalls, that is, acquires the read target file from the archive apparatus 220 (for example, by transmitting the read request for the read target file to the archive apparatus 220, acquires the read target file). Then, the file system 1211 writes the file to the LU 1100. At the STEP 20, the file system 1211 (reception program 12110) transmits the file to the client/host 130.

Note that one file read request may exist for one file or multiple requests may exist for one file. In the latter case, the file is read partially. For each of the multiple read requests for one file, what part of the file to be read may be specified. As more specifically described, for example, it may be permitted that the read request comprises the information indicating the offset value from the head of the file and the size to be read (the information indicating the part of the file) and that the file system 1211 determines whether the part of the file is recalled or not. If the part of the file is recalled, the file system 1211 transmits the recalled part of the file to the client/host 130 and, if the part of the file is not recalled, may acquire the relevant part of the file from the archive apparatus 220.

Meanwhile, from the client/host 130, before the file read request, an open request is issued and, after the file read request, a close request is issued. The completion of the processing for the three requests which are the open request, the read request, and the close request is considered to be the completion of one read processing.

In this embodiment, the timing for actually deleting the migration target file (the file whose deletion is permitted) is the timing which is defined by paying attention to the specification that the open request is issued before the read request and that the close request is issued after the read request.

As more specifically described, as shown in FIG. 12A, the file system 1211, if receiving an open request, adds 1 to the reference count value for the open target file (the file to be read). The file system 1211, each time receiving an open request, adds 1 to the reference count value for the open target file.

Meanwhile, as shown in FIG. 12B, the file system 1211, if receiving a close request, subtracts 1 from the reference count value for the close target file (the file which was read). The file system 1211, each time receiving a close request, subtracts 1 from the reference count value for the close target file.

Then, if the reference count value for the migration target file (the file whose stubbing flag 3100 is "ON" and whose data/metadata synchronization necessity flag 3101/3102 is "OFF") changes from a value larger than 0 to 0, as shown in FIG. 12C, the local mover 1210 deletes the relevant file (to be more strict, the entity of the same) from the LU 1100. By this deletion, the migration is supposed to be completed practically. That is, the migration target file becomes a migrated file. Note that, in that case, the file system 1211 updates the inode related to the deleted file. Therefore, for example, the value indicated by the data block address for the deleted file is supposed to be 0 (zero). Furthermore, if Thin Provisioning is applied to the LU 1100 of the Edge 100 side (refer to FIG. 22), instead of deleting the relevant file, it may also be permitted to overwrite the relevant file with a specific fixed value (e.g. 0) and notify the RAID system 110 that the virtual area where the relevant file was stored (the block address where the relevant file was stored) can be released. The RAID system 110, receiving the notification, may release the page 1130 assigned to the notified virtual area from the virtual area. At this point, the virtual area, as described above, indicates a virtual storage area configuring the virtual LU (the LU to which Thin Provisioning is applied) 1100. Furthermore, overwriting the relevant file with a specific fixed value indicates overwriting the entire area of the page 1130 assigned to this virtual area with a fixed value via the virtual area storing the relevant file. If a fixed value is written to the entire area of the page 1130, the data in the page 1130 is not necessary for the client/host 130. Therefore, the page 1130 storing the unnecessary data only may be released from the virtual area. By this method, the free capacity of the pool (the number of unassigned pages 1130) can be increased.

According to this type of timing for deletion (timing for migration), it is possible to leave the file whose reference frequency is high in the local side and delete the file whose reference frequency is low from the local side and leave the same only in the remote side.

FIG. 13 shows the flow of the write processing for the migrated file.

At the STEP 23, the file system 1211 (reception program 12110) receives a file write request from the client/host 130.

At the STEP 24, the file system 1211 (reception program 12110) checks the stubbing flag 3100 corresponding to the write target file.

If the stubbing flag 3100 is "ON," at the STEP 25, the file system 1211 acquires the write target file from the archive apparatus 220 and writes the acquired file to the LU 1100. Then, the file system 1211, for the file, sets the stubbing flag 3100 to "OFF" and, at the same time, sets the replication flag 3103 to "ON." Note that, if the write target file is a recalled file, the processing for acquiring the file from the archive apparatus 220 may be skipped.

After that, the file system 1211, in accordance with the write request received at the STEP 23, updates the relevant file in the LU 1100.

Then, the file system 1211, at the STEP 26, sets the data/metadata synchronization necessity flag 3101/3102 for the updated file to "ON." This is because the update of the file made the files and the metadata of the same different between the file storage apparatus 120 side and the archive apparatus 220 side, which made the synchronization processing necessary.

According to the write processing shown in FIG. 13, if a write request is received for the migrated file (if a write request is received for the stub of the file which is deleted from the LU 1100), the stub of the file is supposed to be released.

Meanwhile, according to the above-mentioned description, as shown in FIG. 14A, a threshold of the free capacity of the LU 1100 is set. The free capacity of the LU 1100 is the capacity of the LU 1100 from which the used amount of the LU 1100 is subtracted. The used amount of the LU 1100 is the sum of the total capacity of the non-replication-target files and the total capacity of the replicated files.

According to the status shown in FIG. 14A, the total capacity of the non-replication-target files is larger than the total capacity of the replicated files and, at the same time, the free capacity of the LU 1100, though exceeding the threshold, is close to the threshold.

In this status, if a write request for a migrated file (to be more strict, the stub of the same) occurs, the recall of the file (the read of the file from the archive apparatus 220) causes the file to be written to the LU 1100, which decreases the free capacity of the LU 100 and, as a result, as shown in FIG. 14B, the free capacity might be below the threshold. In this case, the deletion of the replicated file is permitted.

Furthermore, the file which is recalled for the write processing (the file acquired from the link destination identified by the stub) is updated, and becomes necessary to be synchronized.

Therefore, if the time interval of the synchronization processing is set short, the file moving by the recall and the file moving by synchronization result in being performed frequently. That is, the file transfer via the communication network 1 results in occurring frequently.

Therefore, in this embodiment, a non-replication-target file becomes a replication-candidate file on a specified condition, and a replication-candidate file is also replicated.

Figure 15:
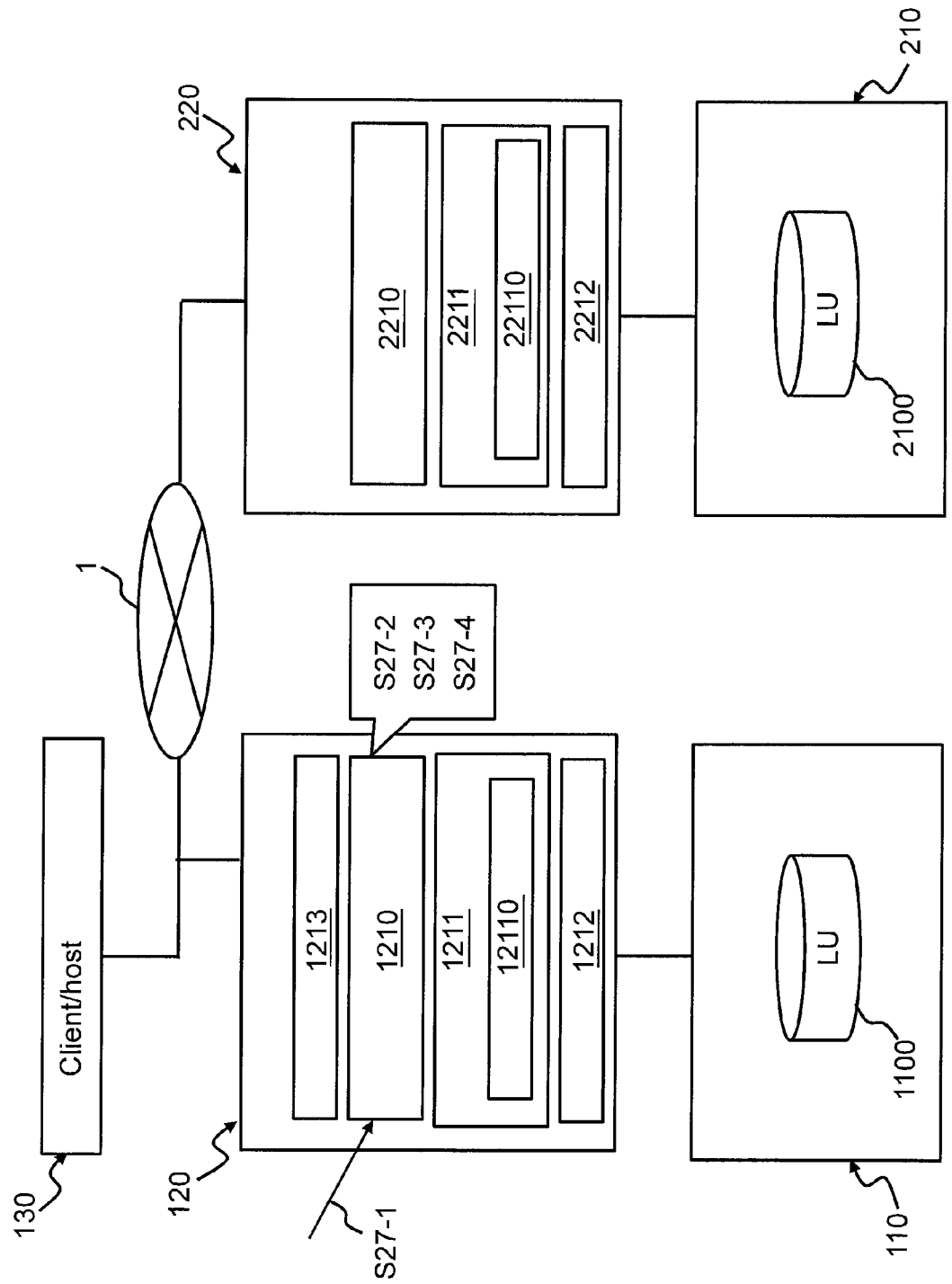
FIG. 15 shows the flow of a processing for making a non-replication-target file a replication-candidate file.
Figure 16:
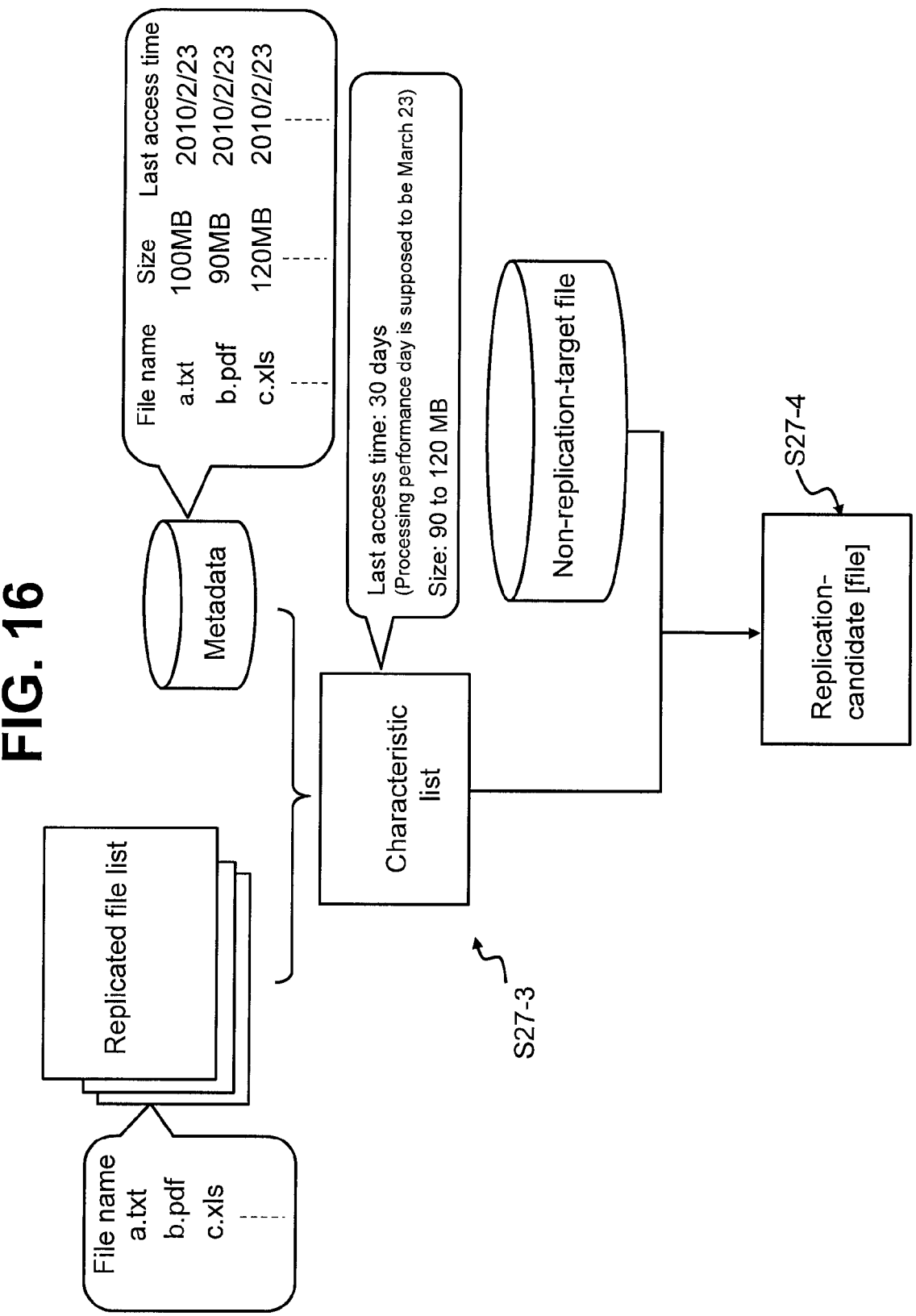
FIG. 16 shows the steps 27-3 and 27-4 in FIG. 15.

FIG. 15 shows the flow of the processing for making a non-replication-target file a replication-candidate file. FIG. 16 shows the STEPs 27-3 and 27-4 shown in FIG. 15.

At the STEP 27-1, the local mover 1210 receives a replication request.

At the STEP 27-2, the local mover 1210 saves a file list included in the replication request (e.g. a list of identification information of the replication target files) in the file storage apparatus 120 (e.g. the memory 121). As the replication target files are replicated as described above, the saved file list is hereinafter referred to as a "replicated file list." The file storage apparatus 120 comprises one or more replicated file lists, for example, in the memory 121.

At the STEP 27-3, the local mover 1210, in accordance with one or more metadata of the multiple replicated files identified by the one or more saved replicated file lists, extracts the common characteristics of those multiple replicated files (e.g. the file size or the last update date). Hereinafter, the information indicating the extracted common characteristics is referred to as a "characteristic list." The characteristic list comprises the information of the common characteristics of one or more types of metadata.

Furthermore, the common characteristic information may be one common value, a range of values (e.g. a range from the minimum value to the maximum value among multiple common values), or may also be one or multiple values accertained by adding or subtracting a certain value to or from the one or multiple common values or by other methods.

After that, at the STEP 27-4, the local mover 1210 compares one or more metadata of the non-replication-target files (the files whose replication flags 3103 are set to "OFF" and, at the same time, the link destinations 3104 are not set) with the common characteristic information which the characteristic list comprises. The local mover 1210, among the non-replication-target files, makes the file corresponding to the metadata which matches the common characteristic information a replication-candidate file.

Figure 17:
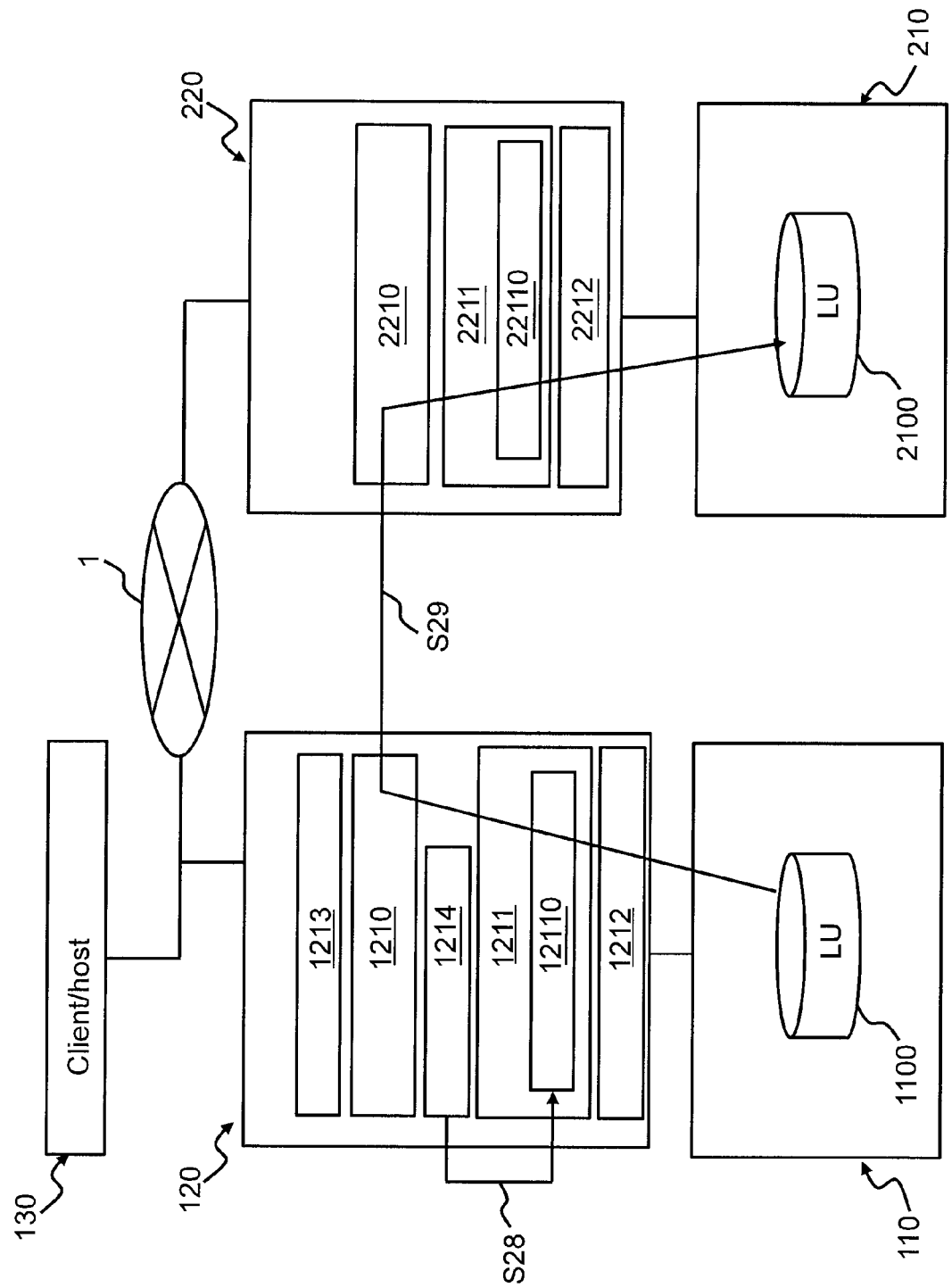
FIG. 17 shows the flow of replicating a replication-candidate file.

The replication-candidate file is replicated. The timing for the replication is determined, for example, in accordance with the determination result of a monitoring program 1214 shown in FIG. 17. The monitoring program 1214 is, as shown in FIG. 17, a program performed by the CPU 122 in the file storage apparatus 120. Note that the timing for replicating the replication-candidate file may not have to be limited to this.

FIG. 17 shows the flow of replicating the replication-candidate file.

The STEP 28 is performed regularly or irregularly.

At the STEP 28, the monitoring program 1214 ascertains the ratio of the total capacity of the non-replication-target files (hereinafter referred to as the non-target ratio) in the LU 1100 to the used amount of the LU 1100 (the total capacity of the replicated files in the LU 1100).

Then, at the STEP 29, the monitoring program 1214, if the non-target ratio exceeds a certain value, performs file replication for the replication-candidate files until the non-target ratio falls below a certain value.

According to the description by referring to FIG. 15 to FIG. 17, if the non-target ratio is over a certain value, among the multiple files which are not specified as the replication target (non-replication-target files), one or more files are replicated and, by that method, become replicated files. That is, the number of replicated files increases. As the replicated files are stubbed eventually, the free capacity of the LU 1100 is supposed to increase. Therefore, the difference between the free capacity of the LU 1100 and the threshold of the same is expected to increase. Therefore, the prevention of frequent file transfer via the communication network 1 can be expected.

Next, with reference to the flowcharts of FIG. 18 to FIG. 21, the flow of the processing of each program is described.

Figure 18:
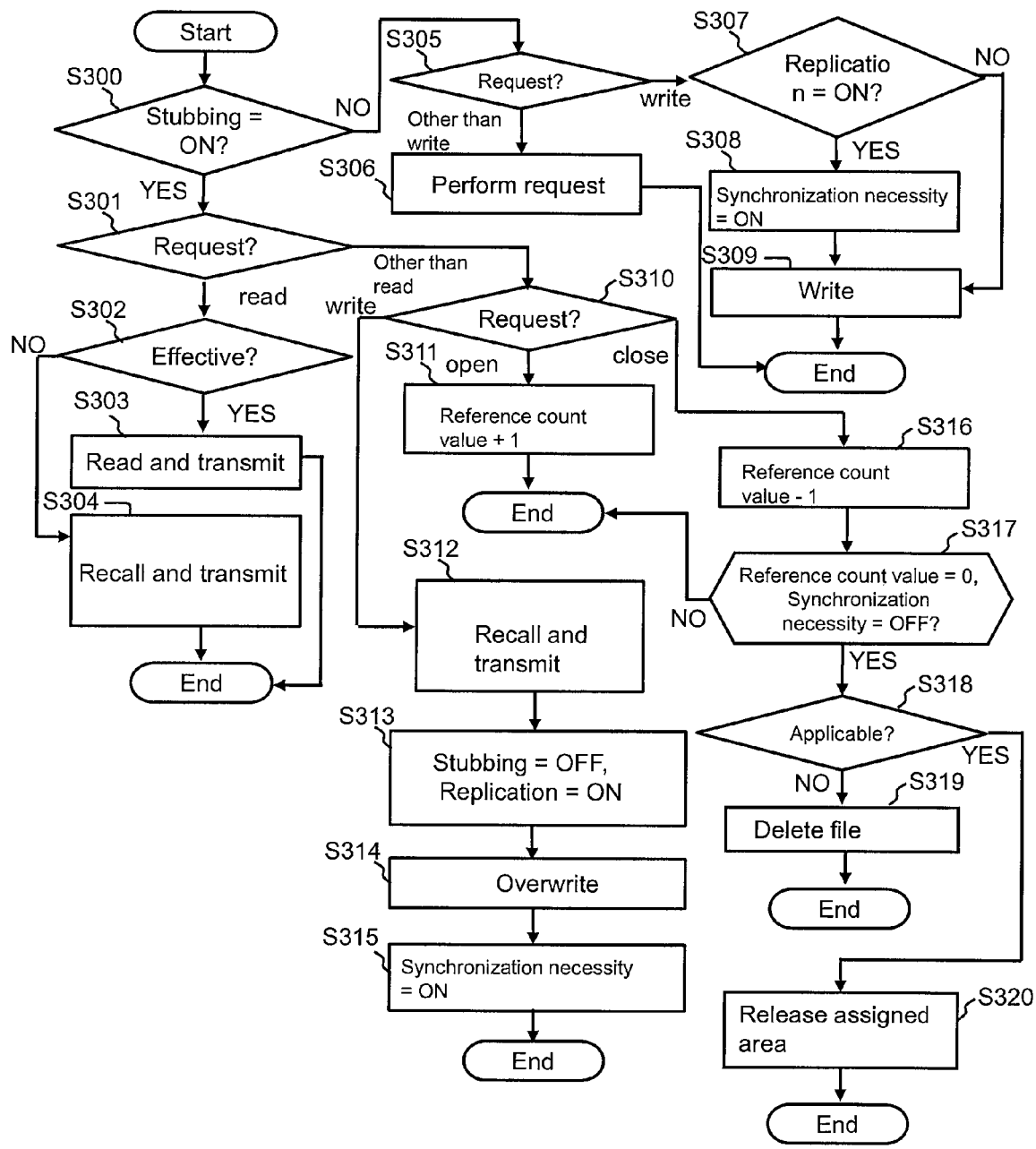
FIG. 18 is a flowchart showing the flow of a processing of a file system 1211 (reception program 12110).

FIG. 18 is a flowchart showing the flow of the processing of the file system 1211 (reception program 12110).

At the STEP 300, the file system 1211, receiving a file processing request (e.g. an access request, an open request, or a close request), checks the stubbing flag 3100 of the file identified by the processing request (hereinafter referred to as a "target file" in the description of FIG. 18). If the stubbing flag 3100 is "ON" (STEP 300: YES), the file system 1211 proceeds to the STEP 301. If the stubbing flag 3100 is "OFF" (STEP 300: NO), as the file remains in the LU 1100, the file system 1211 proceeds to the STEP 305.

At the STEP 301, the file system 1211 checks the received processing request. If the processing request is a read request, the file system 1211 proceeds to the STEP 302 and, if the request is other than a read request, proceeds to the STEP 310.

At the STEP 302, the file system 1211 determines whether the data block address which is a type of metadata of the target file is valid or not. If the data block address is valid (STEP 302: YES), the file system 1211 proceeds to the STEP 303. If the data block address is not valid (STEP 302: NO), the file system 1211 proceeds to the STEP 304.

At the STEP 303, the file system 1211 reads the target file from the LU 1100, and transmits the read file to the request source (client/host 130).

At the STEP 304, the file system 1211 recalls the file. That is, the file system 1211 requires the local mover 1210 to acquire the target file from the archive apparatus 220, temporarily stores the file which is acquired from the archive apparatus 220 in response to the request in the LU 1100, and transmits the same to the request source.

At the STEP 305, the file system 1211 checks the received processing request. If the processing request is other than a write request (STEP 305: NO), the file system 1211 proceeds to the STEP 306 and, if the processing request is a write request, proceeds to the STEP 307.

At the STEP 306, the file system 1211 performs the processing complying with the received processing request (an open request, a close request, or a read request).

At the STEP 307, the file system 1211 confirms the replication flag 3103 of the target file. If the replication flag 3103 is "ON" (STEP 307: YES), the file system 1211 proceeds to the STEP 308. If the replication flag 3103 is "OFF" (STEP 307: NO), the file system 1211 proceeds to the STEP 309.

At the STEP 308, the file system 1211 sets the data/metadata synchronization necessity flag 3101/3102 of the target file to "ON." This is because the target files and the metadata of the same become different between the file storage apparatus 120 and the archive apparatus 220 by the write processing at the subsequent STEP 309.

At the STEP 309, the file system 1211 performs the write processing for the target file. Furthermore, if Thin Provisioning is applied to the LU 1100 of the Edge 100 side (FIG. 22), when the STEP 309 is performed, pages are assigned as the storage area.

At the STEP 310, the file system 1211 checks the received processing request. If the processing request is a write request, the file system 1211 proceeds to the STEP 312. If the processing request is an open processing, the file system 1211 proceeds to the STEP 311. If the processing request is a close processing, the file system 1211 proceeds to the STEP 316.

At the STEP 311, the file system 1211 adds 1 to the reference count value for the target file, and performs the open processing.

At the STEP 312, the file system 1211 recalls the target file to the data mover program 1210 (requires the archive apparatus 220 to acquire the file).

At the STEP 313, the file system 1211, for the target file, sets the stubbing flag 3100 to OFF and the replication flag 3103 to ON.

At the STEP 314, the file system 1211 updates the file acquired at the STEP 312 (overwrites the file with the file complying with the processing request). Furthermore, if Thin Provisioning is applied to the LU 1100 of the Edge 100 side (refer to FIG. 22), when the STEP 314 is performed, pages are assigned as the storage area.

At the STEP 315, the file system 1211 sets the data/metadata synchronization necessity flag 3101/3102 of the target file to "ON."

At the STEP 316, the file system 1211 subtracts 1 from the reference count value for the target file, and performs the close processing.

At the STEP 317, the file system 1211 determines whether the reference count value for the target file is 0 and, at the same time, whether the data/metadata synchronization necessity flag 3101/3102 of the target file is "OFF" or not.

If the result of the determination at the STEP 317 is affirmative (STEP 317: YES), at the STEP 318, the file system 1211 determines whether to apply Thin provisioning or not. If the result of the determination is negative (STEP 318: NO), at the STEP 319, the file system 1211 deletes the target file from the LU 1100 (the metadata of the target file remains in the file system information). Furthermore, at the STEP 318, if the result of the determination is affirmative (STEP 318: YES), the file system 1211 releases the assigned area at the STEP 320 (the metadata of the target file remains in the file system information). By this method, the practical migration of the target file is completed.

If the result of the determination at the STEP 317 is negative (STEP 317: NO), the file system 1211 does not delete the target file. This is because that the reference count value for the target file is one or larger indicates that the target file is referred to by any of the clients/hosts 130.

Figure 19:
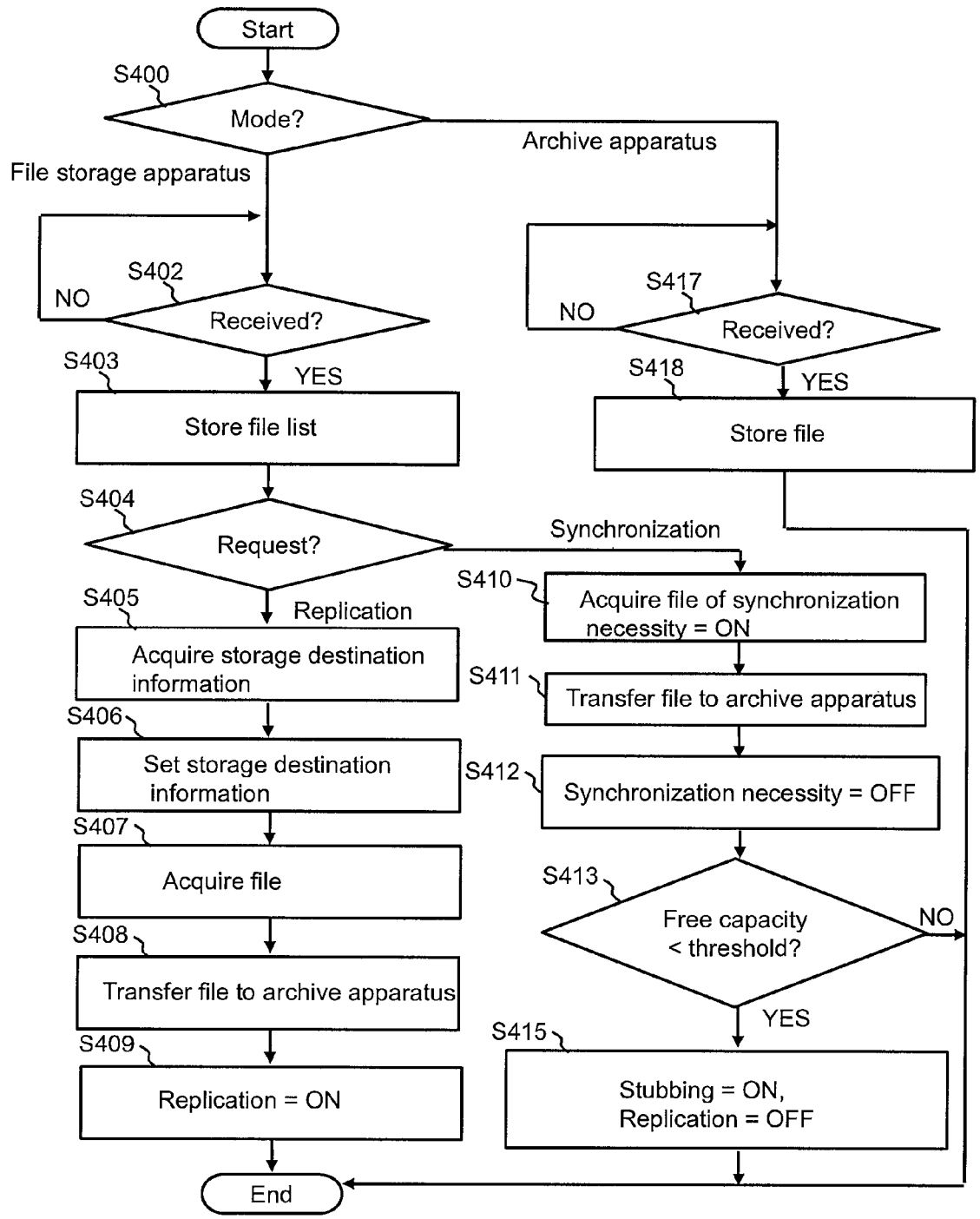
FIG. 19 is a flowchart showing the flow of a processing of a data mover program.

FIG. 19 is a flowchart showing the flow of the processing of the data mover program.

In this embodiment, it is possible to make both the file storage apparatus 120 and the archive apparatus 220 perform the same data mover program. The operation modes of the data mover program are the file storage apparatus and the archive apparatus and, the operation mode to be set depends on by which of the apparatus 120 or the 200 the program is performed.

At the STEP 400, the data mover program checks the operation mode which is set. If the operation mode is "file storage apparatus," the program proceeds to the STEP 402 and, if the operation mode is "archive apparatus," proceeds to the STEP 417.

At the STEP 402, the data mover program determines whether a processing request for the replication target file is received or not. At this point, the processing request is a replication request or a data/metadata synchronization processing request. If receiving a processing request (STEP 402: YES), the program proceeds to the STEP 403.

At the STEP 403, the data mover program saves a file list included in the processing request.

At the STEP 404, the data mover program checks the type of the processing request. If the processing request is a replication request, the program proceeds to the STEP 405 and, if the processing request is a synchronization processing request, proceeds to the STEP 410.

At the STEP 405, the data mover program acquires the storage destination information (e.g. an URL) of the file identified by the saved file list (replication target file) from the archive apparatus 220.

At the STEP 406, the data mover program registers the acquired storage destination information for the replication target file as the link destination 3104.

At the STEP 407, the data mover program reads the replication target file from the LU 1100.

At the STEP 408, the data mover program transfers the read file to the archive apparatus 220. As more specifically described, for example, the data mover program transmits a write request for the read file (a write request comprising the storage destination information indicated by the link destination 3104 of the file) to the archive apparatus 220.

At the STEP 409, the data mover program sets the replication flag 3103 of the transferred file to "ON." By this method, the relevant file becomes a replicated file.

At the STEP 410, the data mover program reads the file whose data/metadata synchronization necessity flag 3101/3102 is ON from the LU 1100.

At the STEP 411, the data mover program transfers the read file to the archive apparatus 220. As more specifically described, for example, the data mover program transmits a write request for the read file (a write request comprising the storage destination information indicated by the link destination 3104 of the file) to the archive apparatus 220.

At the STEP 412, the data mover program sets the data/metadata synchronization necessity flag 3101/3102 to "OFF" for the transferred file. By this method, the synchronization processing for the replicated file is completed.

At the STEP 413, the data mover program determines whether the free capacity of the LU 1100 is below a specified threshold or not.

If the free capacity of the LU 1100 is below the specified threshold (STEP 413: YES), at the STEP 415, the data mover program, for the file whose replication flag 3103 is "ON," sets the stubbing flag 3100 to "ON" and, at the same time, sets the replication flag 3103 to "OFF." That is, the deletion of the replicated file is permitted. After this, the read processing for the relevant file by the client/host 130 is performed for at least once and, if the reference count value for the file becomes 0, the file is deleted. That is, the migration is completed practically.

At the STEP 417, the data mover program determines whether the file is received from the file storage apparatus 120 or not. If the file is received (STEP 417: YES), the program proceeds to the STEP 418.

At the STEP 418, the data mover program stores the received file in the LU 2100.

Figure 20:
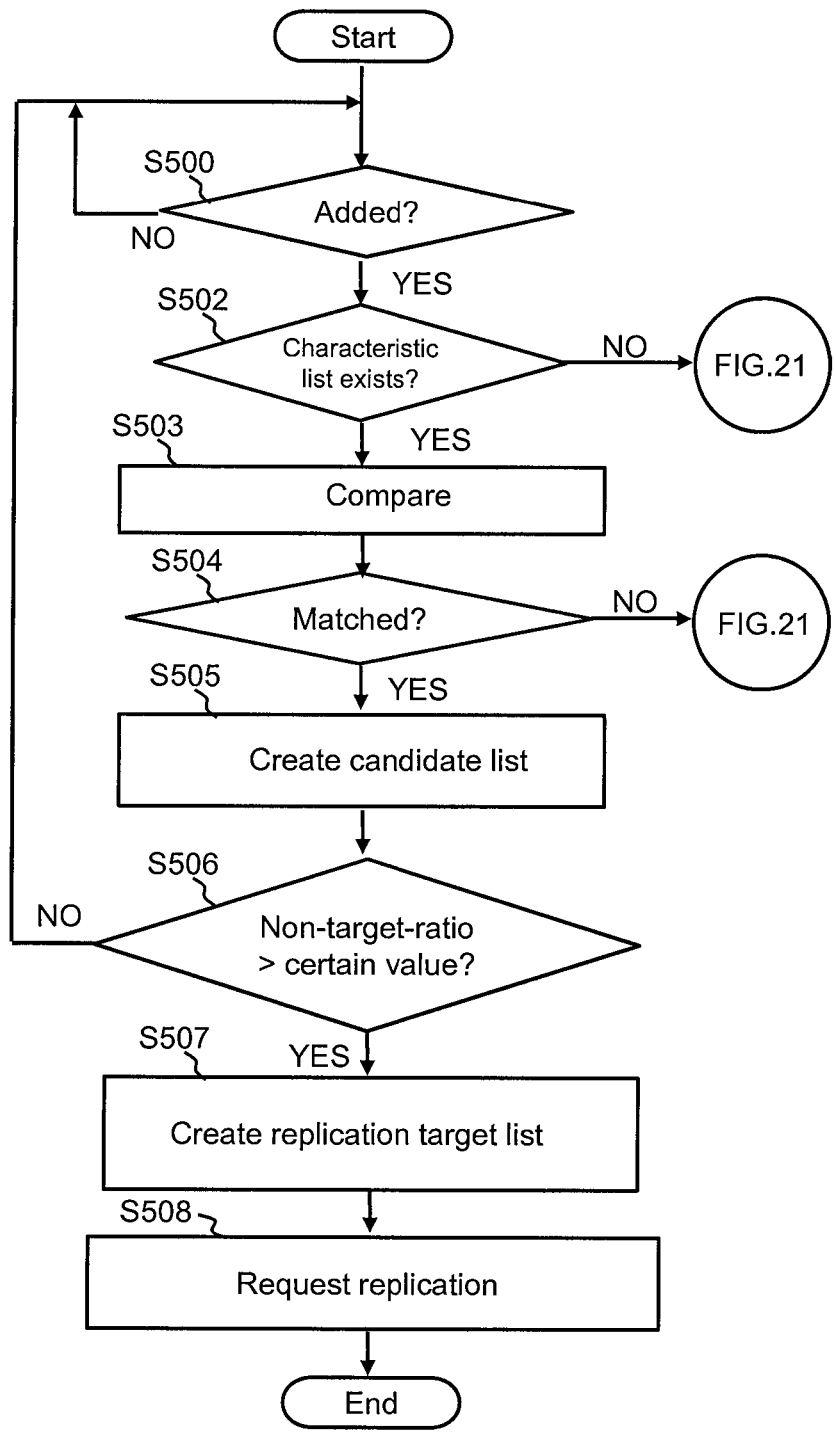
FIG. 20 is a flowchart showing a part of the flow of a processing of a monitoring program 1214.
Figure 21:
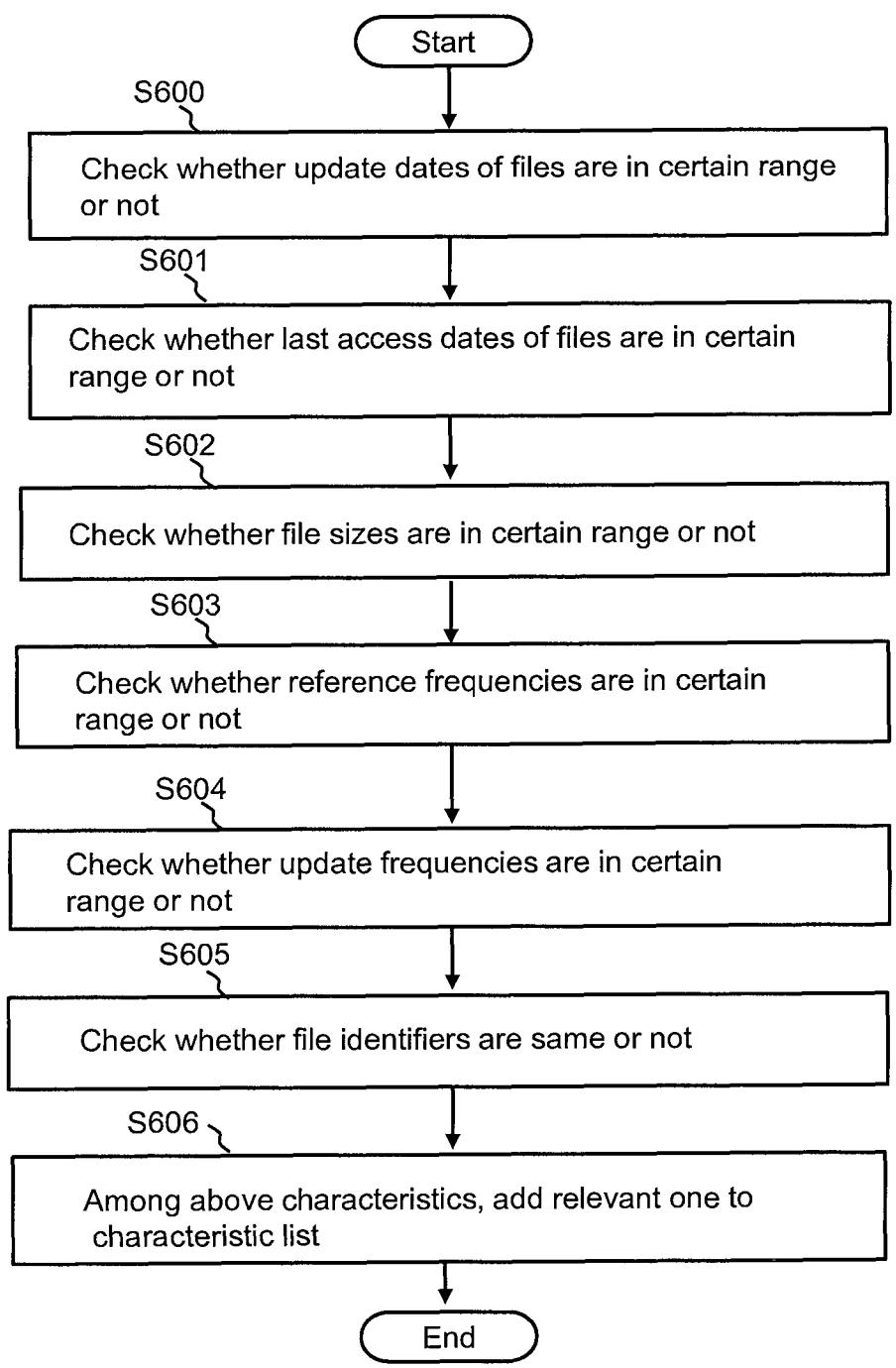
FIG. 21 is a flowchart showing another part of the flow of a processing of the monitoring program 1214.

FIG. 20 and FIG. 21 are the flowcharts showing the flow of the processing of the monitoring program 1214.

At the STEP 500, the monitoring program 1214 checks whether a file list (replicated file list) is added or not. If a file list is added (S500: YES), the program proceeds to the STEP 502.

At the STEP 502, the monitoring program 1214 checks whether a characteristic list exists or not. If a characteristic list exists (STEP 502: YES), the program proceeds to the STEP 503. If no characteristic list exists (STEP 502: NO), for creating a characteristic list, the monitoring program 1214 performs the processing shown in FIG. 21.

At the STEP 503, the monitoring program 1214 compares the metadata of the file identified by the added file list with the common characteristic information of the characteristic list. As a result, if the metadata matches the common characteristic information (STEP 504: YES), the program proceeds to the STEP 505. If the metadata does not match the common characteristic information (STEP 504: NO), for adding new common characteristic information to the characteristic list, the monitoring program 1214 performs the processing shown in FIG. 21.

At the STEP 505, the monitoring program 1214 compares the metadata for the non-replication-target file with the common characteristic information which the characteristic list comprises, and makes the non-replication-target file corresponding to the metadata matching the common characteristic information a replication candidate. At this point, a list of replication-candidate files (hereinafter referred to as a candidate list) is created. The candidate list, for example, comprises the identification information of each replication-candidate file.

At the STEP 506, the monitoring program 1214 ascertains the above-mentioned non-target ratio (the ratio of the total capacity of the non-replication-target files to the used amount of the LU 1100 (the total sum of the total capacity of the replication target files and the total capacity of the non-replication-target files), and determines whether the ratio is over a certain value or not. If the ratio is over the value (STEP 506: YES), the program proceeds to the STEP 507. If not (STEP 506: NO), the program returns to the STEP 500.

At the STEP 507, the monitoring program 1214, to ensure the non-target ratio becomes the above-mentioned certain value or smaller, selects one or more files from the candidate list. This is performed in accordance with the capacity of each file indicated by the candidate list. The monitoring program 1214 creates a list of the selected files (hereinafter referred to as a replication target list). Note that, instead of creating the list, the above-mentioned candidate list may also be made a replication target list.

At the STEP 508, the monitoring program 1214 transmits a replication request comprising the created replication target list to the local mover 1210. The local mover 1210, in response to the replication request, replicates the files identified by the replication target list.

Meanwhile, as described above, in case of "STEP 502: NO" or "STEP 504: NO," the processing shown in FIG. 21 is performed. This processing is the processing for creating or updating a characteristic list. Though FIG. 21 shows some types of metadata as the check target, those metadata types are merely an example, and are not limited to the example. From the STEP 600 to the STEP 605, for detecting common characteristics, various characteristics (metadata) are compared with the metadata of the multiple replicated files including the added replicated file.

At the STEP 600, the monitoring program 1214 checks whether the update dates of the multiple replicated files are within a certain range or not.

At the STEP 601, the monitoring program 1214 checks whether the last access dates of the multiple replicated files are within a certain range or not.

At the STEP 602, the monitoring program 1214 checks whether the capacities (sizes) of the multiple replicated files are within a certain range or not.

At the STEP 603, the monitoring program 1214 checks whether the reference frequencies (read frequencies) of the multiple replicated files are within a certain range or not.

At the STEP 604, the monitoring program 1214 checks whether the update frequencies (write frequencies) of the multiple replicated files are within a certain range or not.

At the STEP 605, the monitoring program 1214 checks whether the extensions of the multiple replicated files are the same or not.

At the STEP 606, the monitoring program 1214, if detecting a common characteristic among the multiple replicated files at the STEPs 601 to 605, adds the information indicating the characteristic to the characteristic list.

Though one embodiment of this invention was described above, this is merely an example for the description of this invention, and the scope of this invention is not intended to be limited to this embodiment. This invention can also be achieved in other various embodiments.

For example, instead of the RAID system(s) 110 and/or 210, other types of storage apparatuses may also be adopted.

Furthermore, though the replication flag 3103 is set to "ON" for a replicated file, the data/metadata synchronization necessity flag 3101/3102 may be set to "OFF."

Furthermore, the deletion of a migration target file (a file whose replication flag 3103 is "ON" and, at the same time, whose data/metadata synchronization necessity flag 3101/3102 is "OFF") may also be performed at the timing other than the reference count value becoming 0. For example, after a certain period of time passes after the last access date and time of the migration target file, the file may also be deleted.

Furthermore, the stub may also be released by other triggers than the update for the file corresponding to the stub.

Furthermore, the storage area where the file is stored may not be limited to the LU.

REFERENCE SIGN LIST

20: File storage apparatus, 220: Archive apparatus

The invention claimed is:

1. A file server which is a local file server that is coupled to a communication network to which is coupled to a remote file server managing a remote storage device and that manages a local storage device, the file server comprising:
   a first communication interface device which is coupled to the communication network;
   a second communication interface device which is coupled to a user terminal for sending an access request that is either a read request or a write request specifying a file, and which is configured to receive the access request from the user terminal; and
   a processor which is coupled to the first and second interface devices,
   wherein the processor is configured to:
   (A) transfer a file in the local storage device to the remote file server;
   (B) manage the transferred file as a migration target file;
   (C) not delete the migration target file from the local storage device even when the (B) is completed, and delete the migration target file from the local storage device when a certain length of time has passed from the last access time when free capacity of the local storage device falls below a specified threshold;
   (K) acquire, from the remote file server, upon receiving a write request with respect to a stub of the migration target file that has been deleted from the local storage device, a file managed by the remote file server which is the link destination identified from this stub;
   (L) store the acquired file in the local storage device; and
   (M) update the acquired file in accordance with the write request received in the (K); and
   release the stub when performing the (K).

2. A file server according to claim 1, wherein the communication network is the Internet, and
   the second communication interface device is coupled to multiple user terminals.

3. A file server according to claim 2, wherein each user terminal sends an open request before the read request, and sends a close request after the read request,
   the processor is configured to:
   (E) update a count value of the migration target file in accordance with a first rule each time receiving the open request; and
   (F) update a count value of the migration target in accordance with a second rule each time receiving the close request.

4. A file server according to claim 1, wherein the processor is configured to:
(H) manage the transferred file as a synchronization target file upon receiving a write request with respect to the transferred file; and
(I) transfer the synchronization target file to the remote file server so that the transferred file managed by the remote file server matches the synchronization target file.

5. A file server according to claim 1, wherein the processor is configured to perform (A) regularly.

6. A storage system comprising:
a remote file server configured to manage a remote storage device; and
a local file server configured to manage a local storage device and coupled to the remote file server via a communication network,
wherein the local file server is configured to:
(A) transfer a file in the local storage device to the remote file server via the communication network, and the remote file server is configured to store this file in the remote storage device, thereby replicating data from this file;
(B) manage, as a migration-target file, the transferred file in the local storage device;
(C) not delete the migration target file from the local storage device even when the (B) is completed, and delete the migration target file from the local storage device when a certain length of time has gassed from the last access time when free capacity of the local storage device falls below a specified threshold;
(K) acquire, from the remote file server, won receiving a write request with respect to a stub of the migration target file that has been deleted from the local storage device, a file managed by the remote file server which is the link destination identified from this stub;
(L) store the acquired file in the local storage device; and
(M) update the acquired file in accordance with the write request received in the (K); and the processor is configured to release the stub when performing the (K).

7. A non-transitory computer-readable medium encoded with a computer program that causes a local file server that is coupled to a communication network to which is connected a remote file server managing a remote storage device and that manages a local storage device, to execute the following (A) through (C):
(A) transferring a file in the local storage device to the remote file server;
(B) managing the transferred file as a migration target file;
(C) not deleting the migration target file from the local storage device even when the (B) is completed, and deleting the migration target file from the local storage device when a certain length of time has passed from the last access time when free capacity of the local storage device falls below a specified threshold;
(K) acquiring, from the remote file server, upon receiving a write request with respect to a stub of the migration target file that has been deleted from the local storage device, a file managed by the remote file server which is the link destination identified from is stub;
(L) storing the acquired file in the local storage device; and
(M) updating the acquired file in accordance with the write request received in the (K); and
releasing the stub when performing the (K).

8. A file storage apparatus coupled to a remote file server managing a remote storage device via a communication network, the file storage apparatus comprising:
a local storage device; and
a local server, the local server including:
a first communication interface device which is coupled to the communication network;
a second communication interface device which is coupled to a user terminal for sending an access request that is either a read request or a write request specifying a file, and which is configured to receive the access request from the user terminal; and
a processor which is coupled to the first and second interface devices, wherein the local server is configured to:
(A) transfer a file in the local storage device to the remote file server;
(B) manage the transferred file as a migration target file; and
(C) not delete the migration target file from the local storage device even when the (B) is completed, and delete the migration target file from the local storage device when a certain length of time has passed from the last access time when free capacity of the local storage device falls below a specified threshold;
(K) acquire, from the remote file server, upon receiving a write request with respect to a stub of a migration target file that has been deleted from the local storage device, a file managed by the remote file server which is the link destination identified from this stub;
(L) store the acquired file in the local storage device; and
(M) update the acquired file in accordance with the write request received in the (K); and
the processor is configured to release the stub when performing the (K).

9. A file storage apparatus according to claim 8, wherein the communication network is the Internet, and the second communication interface device is coupled to multiple user terminals.

10. A file storage apparatus according to claim 8, wherein the processor is configured to perform (A) regularly.

11. A file server according to claim 8, wherein the processor is configured to:
(H) manage the transferred file as a synchronization target file upon receiving a write request with respect to the transferred file; and
(I) transfer the synchronization target file to the remote file server so that the transferred file managed by the remote file server matches the synchronization target file.

* * * * *